United States Patent
Park et al.

(10) Patent No.: US 10,455,433 B2
(45) Date of Patent: Oct. 22, 2019

(54) METHOD AND APPARATUS FOR TRANSMITTING OR RECEIVING DOWNLINK SIGNAL IN UNLICENSED BAND OF WIRELESS COMMUNICATION SYSTEM

(71) Applicant: LG ELECTRONICS INC., Seoul (KR)

(72) Inventors: Hanjun Park, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

(21) Appl. No.: 15/184,834

(22) Filed: Jun. 16, 2016

(65) Prior Publication Data

US 2016/0374059 A1    Dec. 22, 2016

Related U.S. Application Data

(60) Provisional application No. 62/180,078, filed on Jun. 16, 2015.

(51) Int. Cl.
| | |
|---|---|
| *H04W 16/32* | (2009.01) |
| *H04W 74/08* | (2009.01) |
| *H04L 5/00* | (2006.01) |
| *H04L 27/00* | (2006.01) |
| *H04W 16/14* | (2009.01) |

(52) U.S. Cl.
CPC ............. *H04W 16/32* (2013.01); *H04L 5/001* (2013.01); *H04L 27/0006* (2013.01); *H04W 74/0808* (2013.01); *H04L 5/0048* (2013.01); *H04W 16/14* (2013.01)

(58) Field of Classification Search
None
See application file for complete search history.

(56) References Cited

U.S. PATENT DOCUMENTS

2010/0189038 A1* 7/2010 Chen ..................... H04L 1/0001
370/328
2013/0322392 A1* 12/2013 Abe .......................... H04L 5/00
370/329

(Continued)

*Primary Examiner* — Alex Skripnikov
*Assistant Examiner* — Sharmin Chowdhury
(74) *Attorney, Agent, or Firm* — Lee, Hong, Degerman, Kang & Wiamey

(57) ABSTRACT

A method for channel sensing in an unlicensed band and transmitting downlink signals in a wireless communication system is disclosed. The method is performed by a transmission node configured to transmit the downlink signal after the channel sensing. The method includes sensing a channel scheduled to transmit downlink signals on a secondary cell (S-Cell) in the unlicensed band, and if the channel scheduled to transmit the downlink signals is determined to be in an unoccupied state according to the channel sensing, transmitting the downlink signals through a secondary cell (S-Cell) transmission structure having a boundary of a transmission unit shifted by a specific time index from a boundary of a transmission unit of a primary cell (P-Cell) transmission structure. The specific time index may be selected from among a plurality of candidate time indexes.

14 Claims, 20 Drawing Sheets

(56) References Cited

U.S. PATENT DOCUMENTS

| | | | |
|---|---|---|---|
| 2016/0127098 A1* | 5/2016 | Ng | H04L 5/0048 |
| | | | 370/329 |
| 2016/0278118 A1* | 9/2016 | Yerramalli | H04L 5/001 |
| 2016/0286603 A1* | 9/2016 | Vajapeyam | H04W 76/048 |
| 2017/0094681 A1* | 3/2017 | Takeda | H04W 16/14 |
| 2017/0238311 A1* | 8/2017 | Hooli | H04W 74/0816 |
| | | | 370/329 |

* cited by examiner

METHOD AND APPARATUS FOR TRANSMITTING OR RECEIVING DOWNLINK SIGNAL IN UNLICENSED BAND OF WIRELESS COMMUNICATION SYSTEM

Pursuant to U.S.C. § 119(e), this application claims the benefit of U.S. Provisional Application No. 62/180,078, filed on Jun. 16, 2015, the contents of which are all hereby incorporated by reference herein in its entirety.

BACKGROUND OF THE INVENTION

Field of the Invention

The present invention relates to a wireless communication system, and more particularly to a method and apparatus for transmitting or receiving a downlink signal within an unlicensed band.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method and apparatus for transmitting or receiving a downlink signal within an unlicensed band of a wireless communication system that substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a - - -

According to an embodiment of the present invention, provided is a method for channel sensing in an unlicensed band and transmitting downlink signals in a wireless communication system, wherein the method is performed by a transmission node configured to transmit the downlink signal after the channel sensing, the method comprising: sensing a channel scheduled to transmit downlink signals on a secondary cell (S-Cell) in the unlicensed band; and if the channel scheduled to transmit the downlink signals is determined to be in an unoccupied state according to the channel sensing, transmitting the downlink signals through a secondary cell (S-Cell) transmission structure having a boundary of a transmission unit shifted by a specific time index from a boundary of a transmission unit of a primary cell (P-Cell) transmission structure, the specific time index may be selected from among a plurality of candidate time indexes.

Alternatively or additionally, at least one of the downlink signals transmitted through the S-Cell may be transmitted at a transmission time defined at the P-Cell transmission structure, and the remaining signals other than the at least one of the downlink signals may be transmitted at a transmission time defined at the S-Cell transmission structure.

Alternatively or additionally, the remaining signals may be transmitted at a time point shifted by a predetermined time corresponding to one selected from among the plurality of candidate time indexes from the boundary of the transmission unit of the P-Cell transmission structure.

Alternatively or additionally, a plurality of transmission times of a first downlink signal from among the remaining signals may be defined in reference to a single transmission time of a second downlink signal from among the remaining signals.

Alternatively or additionally, the method may further include transmitting information regarding a plurality of candidate S-Cell transmission structures defined per category of the downlink signals or per group of the downlink signals, to a reception node.

Alternatively or additionally, at least one candidate time indexes from among the plurality of candidate time indexes may be restricted to prevent collision between a specific downlink signal in a transmission unit of the P-Cell and a specific downlink signal in a transmission unit of the S-Cell.

Alternatively or additionally, the method may further include allocating resources for at least one downlink signal or at least one downlink signal group in the S-Cell transmission structure by applying the same resource element (RE) mapping as in the P-Cell transmission structure.

Alternatively or additionally, if the transmission unit of the P-Cell transmission structure includes one or more sub transmission units having the same resource allocation, the S-Cell transmission structure may be shifted by a time index corresponding to a length of the sub transmission unit, and the same resource allocation of the P-Cell transmission structure may be used for the S-Cell transmission structure.

According to another embodiment of the present invention, provided is a transmission node configured to performing channel sensing in an unlicensed band and transmit downlink signals associated with in a wireless communication system, the transmission node comprising: a transmitter; a receiver; and a processor configured to control the transmitter and the receiver, wherein the processor may sense a channel scheduled to transmit downlink signals on a secondary cell (S-Cell) in the unlicensed band, if the channel scheduled to transmit the downlink signals is determined to be in an unoccupied state according to the channel sensing, transmit the downlink signals through a secondary cell (S-Cell) transmission structure having a boundary of a transmission unit shifted by a specific time index from a boundary of a transmission unit of a primary cell (P-Cell) transmission structure, the specific time index may be selected from among a plurality of candidate time indexes.

Alternatively or additionally, at least one of the downlink signals transmitted through the S-Cell may be transmitted at a transmission time defined at the P-Cell transmission structure, and the remaining signals other than the at least one of the downlink signals may be transmitted at a transmission time defined at the S-Cell transmission structure.

Alternatively or additionally, the remaining signals may be transmitted at a time point shifted by a predetermined time corresponding to one selected from among the plurality of candidate time indexes from the boundary of the transmission unit of the P-Cell transmission structure.

Alternatively or additionally, a plurality of transmission times of a first downlink signal from among the remaining signals may be defined in reference to a single transmission time of a second downlink signal from among the remaining signals.

Alternatively or additionally, the processor may transmit information regarding a plurality of candidate S-Cell transmission structures defined per category of the downlink signals or per group of the downlink signals, to a reception node.

Alternatively or additionally, at least one candidate time indexes from among the plurality of candidate time indexes may be restricted to prevent collision between a specific downlink signal in a transmission unit of the P-Cell and a specific downlink signal in a transmission unit of the S-Cell.

Alternatively or additionally, the processor may allocate resources for at least one downlink signal or at least one downlink signal group in the S-Cell transmission structure by applying the same resource element (RE) mapping as in the P-Cell transmission structure.

Alternatively or additionally, if the transmission unit of the P-Cell transmission structure may include one or more sub transmission units having the same resource allocation, the S-Cell transmission structure may be shifted by a time index corresponding to a length of the sub transmission unit, and the same resource allocation of the P-Cell transmission structure may be used for the S-Cell transmission structure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
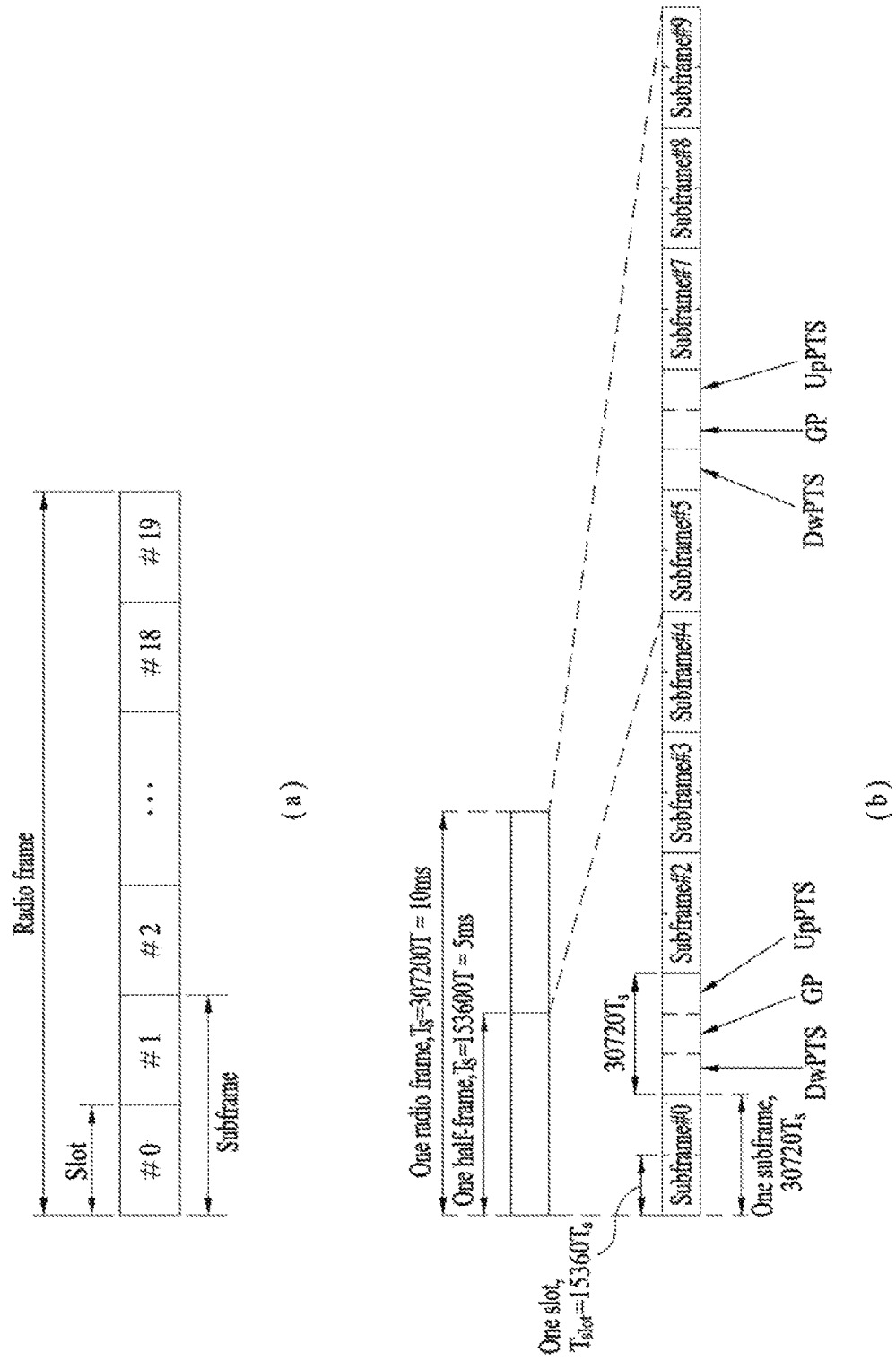
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource.

Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe config-uration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |
| 6 | 19760 · $T_s$ |              |              | 23040 · $T_s$ |              |              |
| 7 | 21952 · $T_s$ |              |              | 12800 · $T_s$ |              |              |
| 8 | 24144 · $T_s$ |              |              | —             | —            | —            |
| 9 | 13168 · $T_s$ |              |              | —             | —            | —            |

Figure 2:
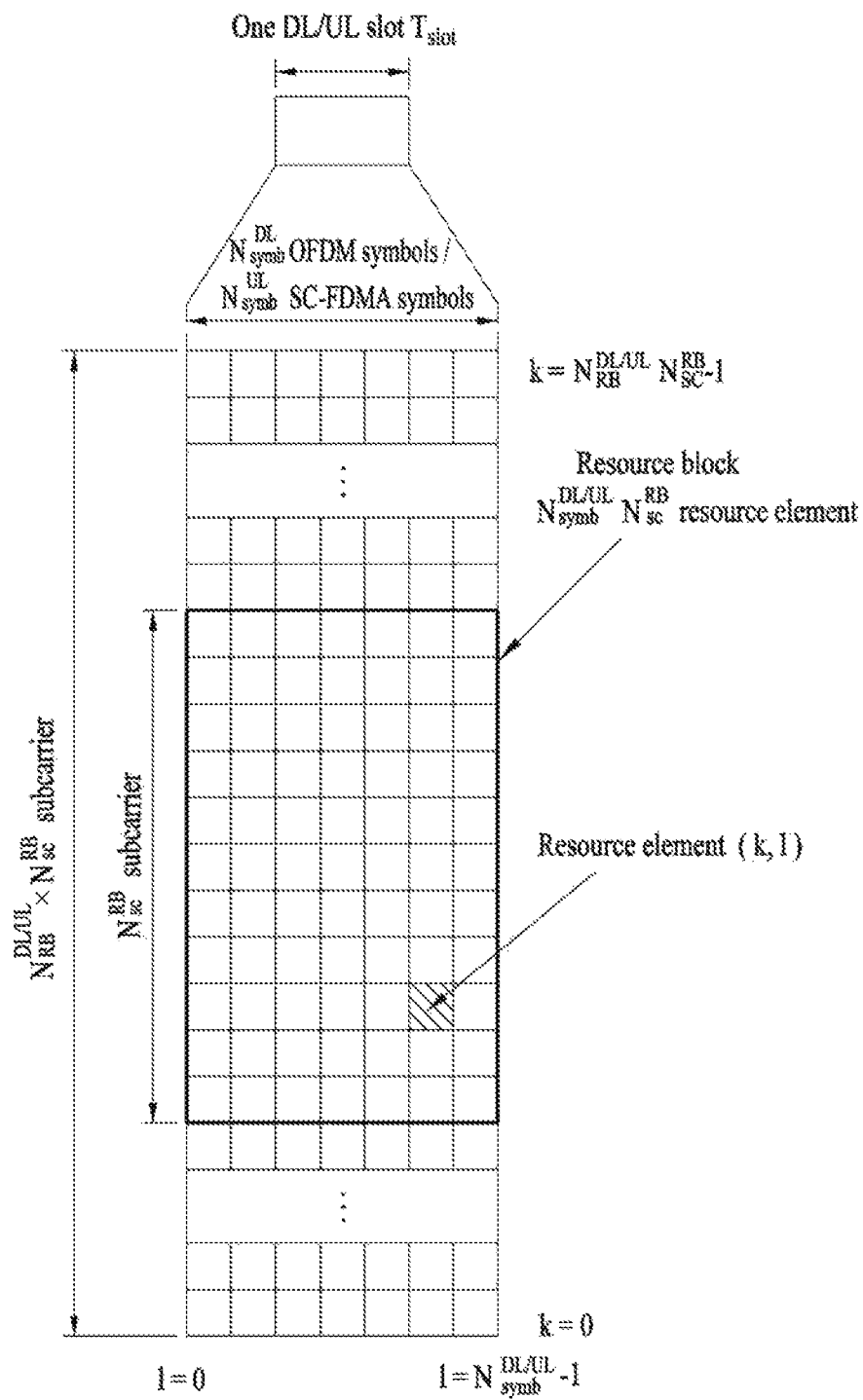
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
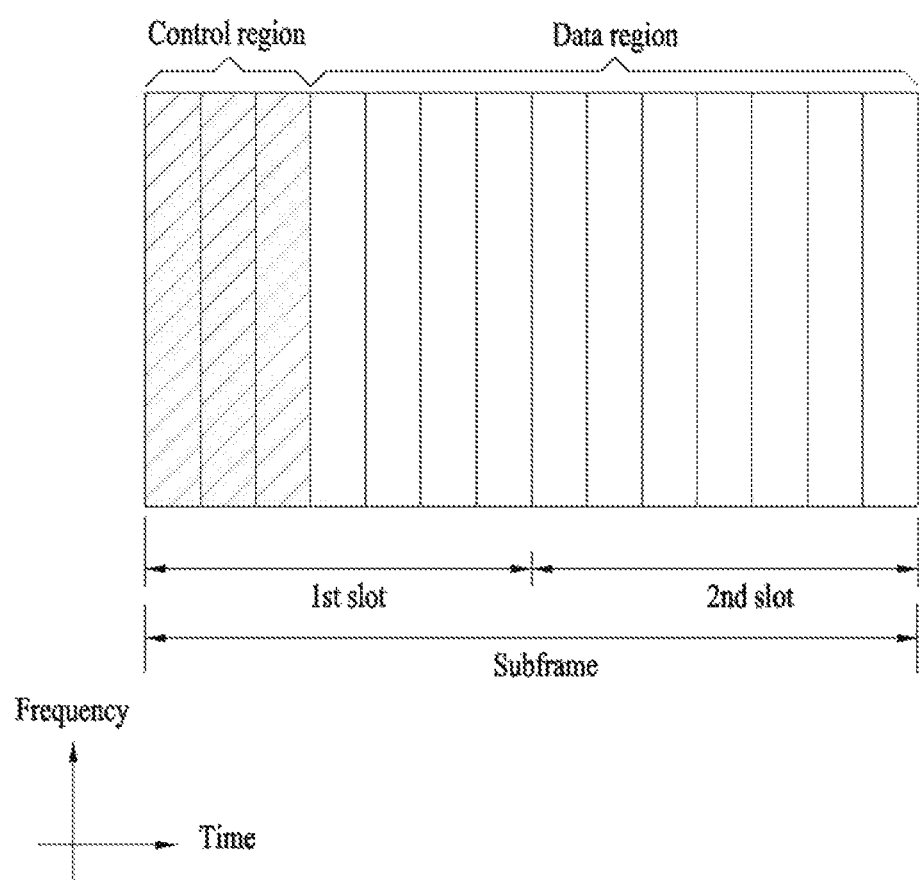
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space Type | Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
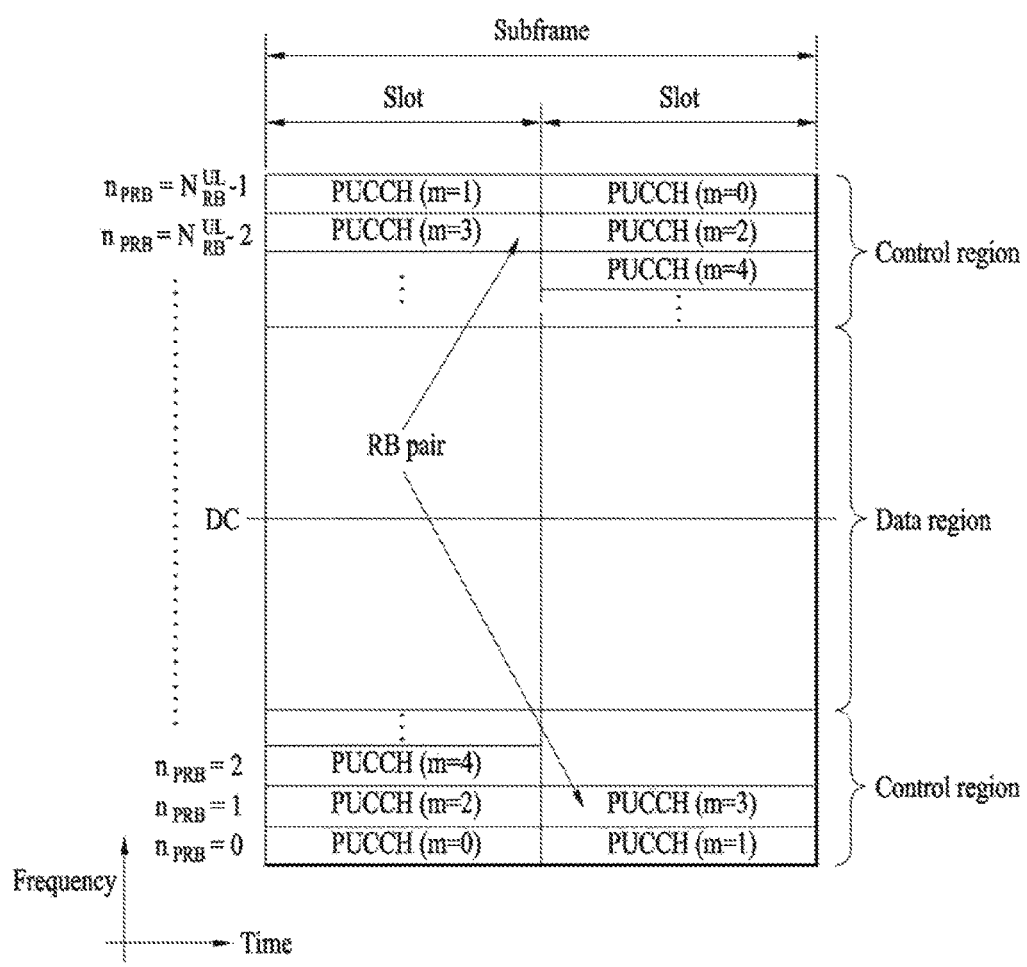
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMFRI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Along with a rapid increase in data traffic attributed to the recent proliferation of smartphones, a future-generation wireless communication system such as 3GPP LTE-A seeks to efficiently utilize a limited frequency band. In this context, operating a cellular network such as an LTE system in an unlicensed band of 2.4 GHz or 5 GHz is under consideration.

Since it is basically assumed that wireless transmission and reception is performed in an unlicensed band through contention between communication nodes, each communication node is requested to make sure that another communication node is not transmitting a signal in the unlicensed band, by channel sensing before transmitting a signal. For the convenience of description, this operation is called listen before talk (LBT) and particularly, an operation for determining whether any other communication node is transmitting a signal is defined as carrier sensing (CS) or clear channel assessment (CCA). If it is determined as a result of CCA that there is no other communication node transmitting a signal, this state is defined as a channel unoccupied state. On the contrary, if there is any other communication node transmitting a signal, this state is defined as a channel occupied state. If an eNB or a UE is to transmit a signal in an unlicensed band in an LTE system, the eNB or the UE should perform LBT. While the eNB or the UE is transmitting a signal, nodes conforming to other communication standards such as Wi-Fi should not interfere with the eNB or the UE by performing LBT. For example, a Wi-Fi standard (e.g., 802.11ac) regulates that a CCA threshold is −62 dBm for a non-Wi-Fi signal and −82 dBm for a Wi-Fi signal. This means that upon receipt of a non-Wi-Fi signal with power (or energy) equal to or higher than −62 dBm, a station (STA) or an access point (AP) does not transmit a signal in order not to cause interference.

Figure 5:
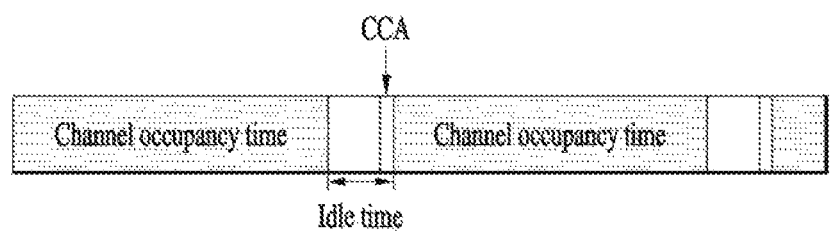
FIG. 5 is a conceptual diagram illustrating a Listen Before Talk (LBT) based channel access operation according to Frame Based Equipment (FBE).

For example, two LBT-based channel access mechanisms are defined in Europe, frame based equipment (FBE) and load based equipment (LBE). In FBE, one frame is comprised of a channel occupancy time (e.g., 1 to 10 ms) being a time period over which a communication node succeeding in channel access may continue transmission, and an idle time being at least 5% of the channel occupancy time, and CCA is defined as an operation for monitoring a channel during at least 20 μs at the last part of the idle time. A communication node periodically performs CCA on a frame basis. If the channel is unoccupied, the communication node transmits data during the channel occupancy time. On the other hand, if the channel is occupied, the communication node defers transmission and waits until a CCA slot of the next period. FIG. 5 illustrates an example of the FBE operation.

Figure 6:
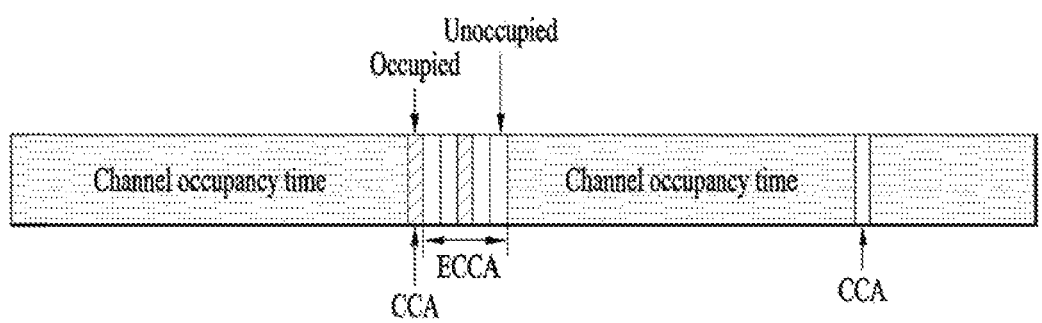
FIG. 6 is a conceptual diagram illustrating a Listen Before Talk (LBT) based channel access operation according to Load Based Equipment (LBE).

In LBE, the communication node first sets q (q ∈ {4, 5, . . . , 32}) and then performs CCA for one slot. If the channel is unoccupied in a first CCA slot, the communication node may transmit data by securing a channel occupancy time of (13/32)q ms. On the contrary, if the channel is occupied in the first CCA slot, the communication node selects N (N ∈ {1, 2, . . . , q}) arbitrarily (i.e., randomly) and stores the selected N value as an initial value for a counter. Then, the communication node senses a channel state on a CCA slot basis. Each time the channel is unoccupied in one specific CCA slot, the communication node decreases the value of the counter by 1. If the value of the counter is 0, the communication node (or UE) may transmit data during the channel occupancy time of (13/32)q ms. FIG. 6 illustrates an example of the LBE operation.

In the above examples, the channel occupied state or the channel unoccupied state may be determined by checking whether reception power exceeds a predetermined threshold in a CCA slot.

Figure 7:
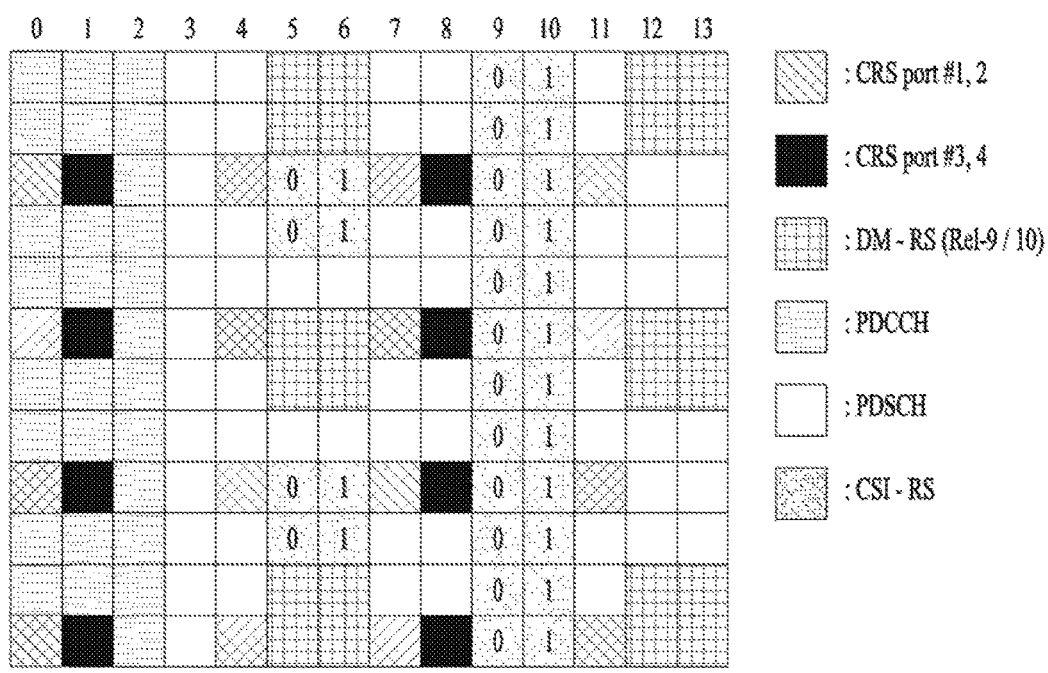
FIG. 7 is a conceptual diagram illustrating Resource Element (RE) mapping of a downlink signal for use in a 3GPP LTE/LTE-A system.

Meanwhile, the wireless communication system such as 3GPP LTE-A may transmit a signal on the basis of a subframe (SF) having a TTI of 1 ms. The subframe (SF) may include a control signal including information needed for data demodulation, a data signal, a DM-RS for channel estimation needed to perform such data demodulation, a CSI measurement resource for CSI feedback needed for link adaptation, a synchronous signal, etc., such that the wireless communication system may transmit the resultant SF to a destination. For example, as can be seen from FIG. 7, a downlink (DL) SF may include various signals, for example, a physical downlink control channel (PDCCH), a physical downlink shared channel (PDSCH), a demodulation reference signal (DM-RS), a cell-specific reference signal (CRS), a channel state information reference signal (CSI-RS), etc.

Figure 8:
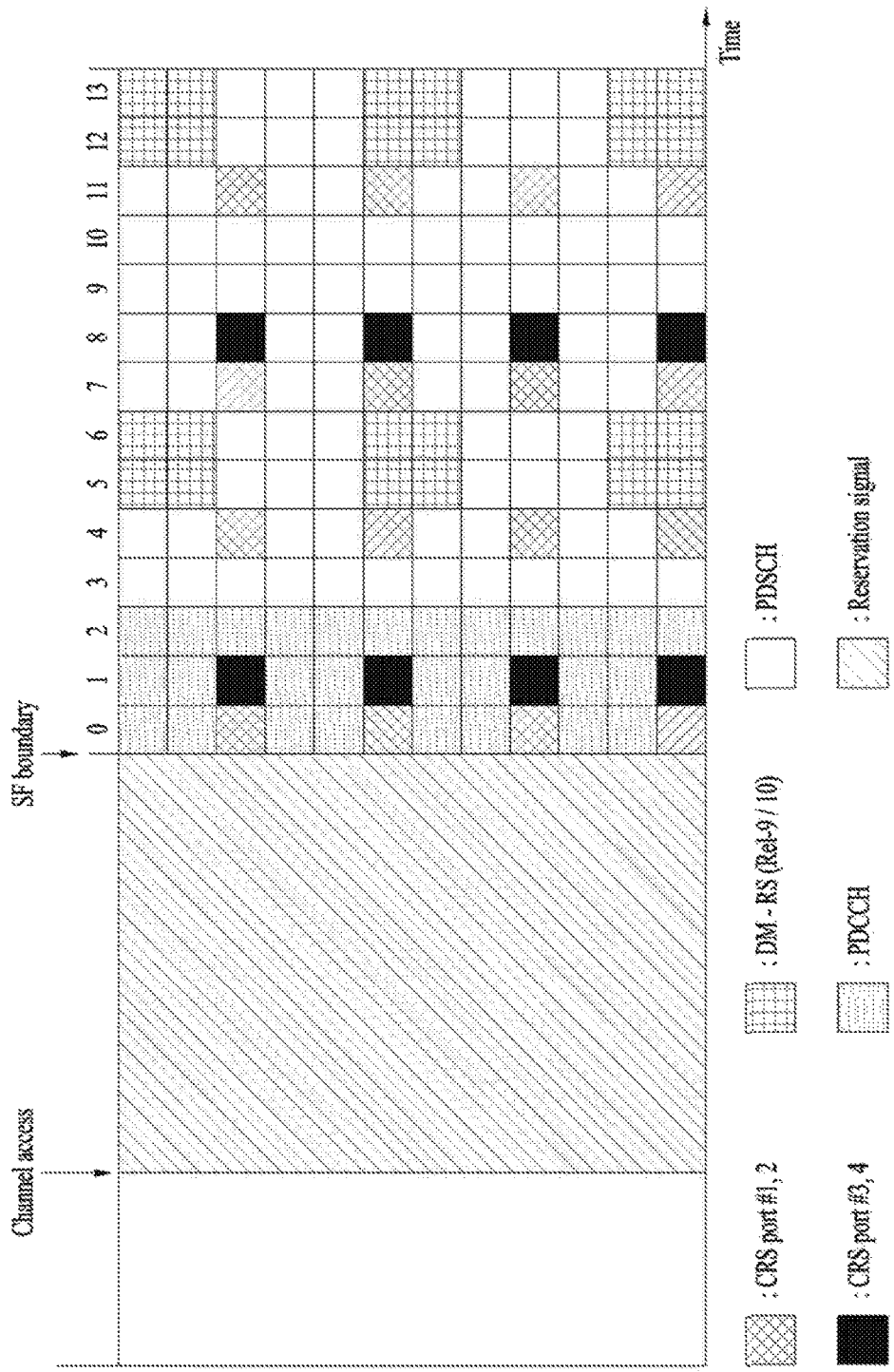
FIG. 8 is a conceptual diagram illustrating transmission of a preliminary signal for adjusting a subframe (SF) boundary in downlink.

Meanwhile, the LAA system is based on the CA operation of the LTE system, such that the SF boundary of a primary cell (P-Cell) and the SF boundary of a secondary cell (S-Cell) (e.g., LAA cell) must be adjusted to the same time. However, assuming that the base station (BS) performs CCA according to the LBT operation, there is a high possibility that channel is occupied before the SF boundary due to contention based transmission characteristics in the unlicensed band. In this case, as one method for allowing the BS to maintain the SF based transmission operation in the same manner as in the legacy LTE system, the BS may transmit a reservation signal or the like to maintain a channel occupancy state prior to the beginning of SF start as shown in FIG. 8.

However, the reservation signal may not perform data transmission and at the same time may perform channel occupancy, such that unexpected interference may occur in other nodes operating in the unlicensed band. Preferably, the number of reservation signals to be used may be minimized in terms of system performance or throughput.

Figure 9:
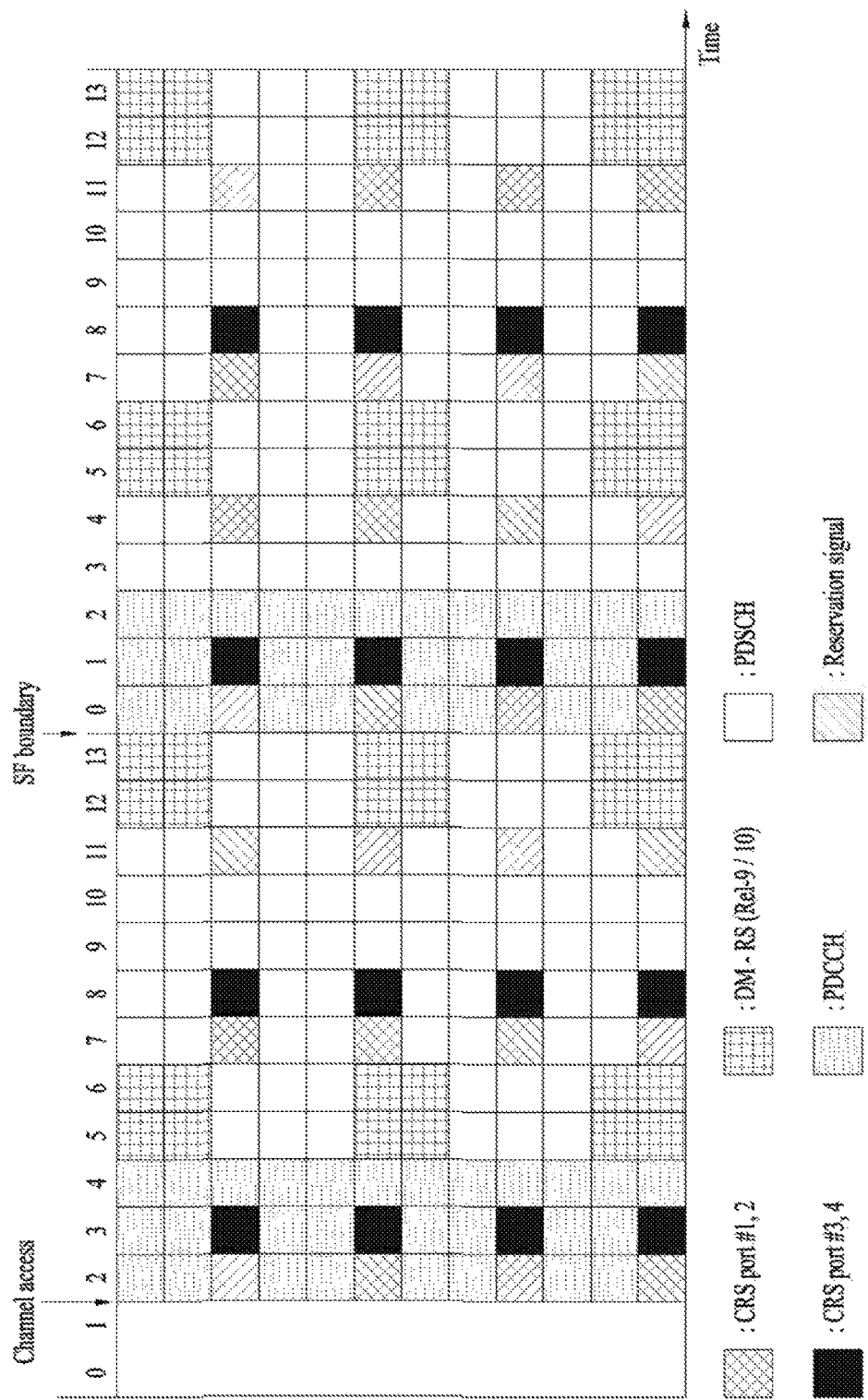
FIG. 9 is a conceptual diagram illustrating partial SF transmission for adjusting the SF boundary in downlink.

In order to address the above-mentioned issues, a method for introducing a transmission unit having a partial TTI has been discussed. That is, if the BS determines that channel occupancy is possible at a specific time while simultaneously performing CCA according to the LBT operation, a partial SF defined for a time section ranging from the corresponding time to the SF boundary may be transmitted as shown in FIG. 9. However, a transmission start time of the partial SF shown in FIG. 9 may be greatly limited under the condition that the partial SF includes PDCCH and DM-RS. For example, as shown in FIG. 9, the partial SF (as well as the entire SF) including a PDCCH region composed of 3 OFDM symbols and a DM-RS may start from each of $0^{th}$, $1^{st}$ and $2^{nd}$ OFDM symbols. In addition, assuming that the start OFDM symbol position of the partial SF is flexibly established even in the case where the CRS is utilized, the BS is unable to recognize the channel occupancy available time, such that the BS must pre-calculate a transport block (TB) for PDSCH in consideration of the lengths of all available partial subframes (SFs), resulting in increased implementation complexity of the BS.

Figure 10:
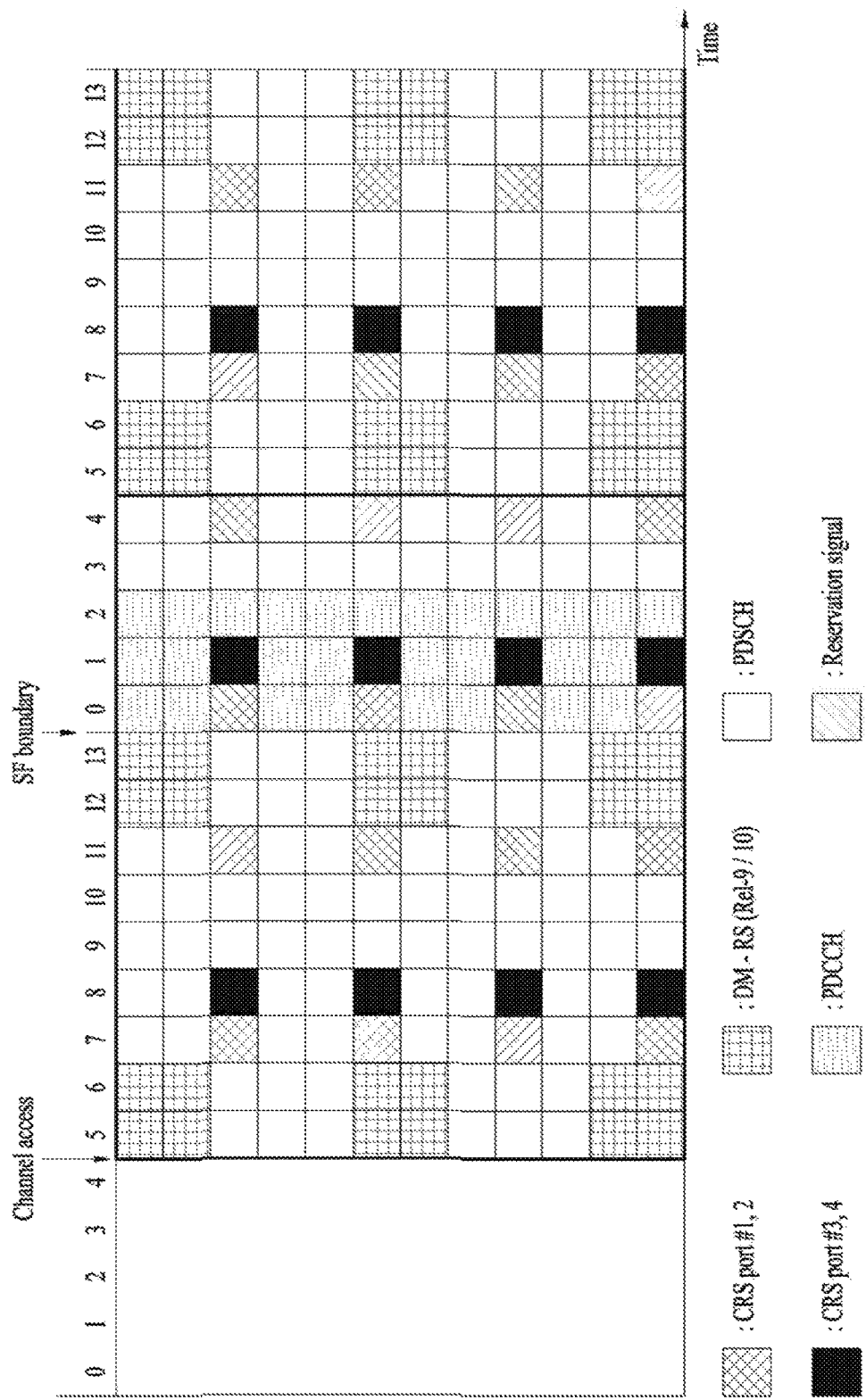
FIG. 10 is a conceptual diagram illustrating floating SF transmission in downlink.

In order to reduce such implementation complexity of the BS as well as to prevent the occurrence of variance of the TB size, the floating SF concept has been discussed as shown in FIG. 10. That is, differently from the SF (i.e., non-floating SF) established to follow the SF boundary of a P-Cell, a transmission section of the time-shifted 1 ms TTI is defined as the floating SF corresponding to a new transmission unit. In FIG. 10, a square denoted by a bold line may denote the floating SF. In this case, the transmission position of signals other than a PDSCH (e.g., PDCCH, CRS, DM-RS, etc.) may be determined on the basis of the non-floating SF. The above-mentioned operation may start data transmission at an arbitrary time, may preserve the SF boundary of the P-Cell according to the CA operation of the LTE system, and the TB size need not be changed. However, according to the floating SF scheme, the PDCCH region may be located behind the PDSCH region, such that the user equipment (UE) must buffer signals corresponding to a maximum of 1 SF.

Therefore, when transmission units, each having a constant TTI (e.g., 1 ms), of the above-mentioned transmission nodes are consecutively present in a wireless communication system comprised of transmission nodes, each of which performs signal transmission on the basis of the LBT operation in consideration of the above-mentioned issues, a plurality of time-shifted transmission structures having the same TTI transmission unit whereas they have different boundary time points between transmission units may be defined, the transmission node may be established in a manner that the transmission time of the corresponding signal follows the reference transmission structure according to categories of a specific signal (or a specific measurement resource), or the transmission node may also be established in a manner that the transmission time of the corresponding signal is based on the time-shifted transmission structure.

In FIG. 10, the non-floating SF may be defined as a specific transmission structure used as a reference from among a plurality of transmission structures, and the floating SF may be defined as a plurality of time-shifted transmission structures having different transmission unit boundaries. In more detail, signals for data demodulation may be based on the transmission structure in which each transmission unit begins with a channel access available start time according to the LBT operation, such that a desired TTI may be maintained and signals can be adaptively transmitted according to the LBT operation. In contrast, transmission positions of network public signals such as CSI measurement or synchronization may be established, resulting in improvement of UE detection complexity.

Although the following description will disclose operations of the embodiments for use in LTE for convenience of description, the operations of the embodiments may also be applied to any wireless communication system configured to perform signal transmission on the basis of a transmission unit within an unlicensed band without departing from the scope or spirit of the present invention.

Method for Setting a Plurality of Transmission Structures Capable of Transmitting a Specific Signal For convenience of description, a structure in which a plurality of transmission units having a constant TTI is consecutively arranged is defined as a transmission structure, and time points at which boundaries between transmission units in a single transmission structure are present is referred to as a transmission unit boundary. In addition, the situation in which a transmission time of a specific signal is based on a specific transmission structure may indicate that a transmission time of the specific signal defined in the specific transmission structure is established. However, it may be impossible for different transmission structures to define the same transmission time for a specific signal. That is, the number of transmission structures corresponding to a specific transmission time is set to 1.

Network (or BS) may define a plurality of time-shifted transmission structures in which a boundary between transmission units is shifted on a time axis by pre-defined specific values on the basis of a specific transmission structure, candidate transmission structures in which a transmission time point of the corresponding signal (or resource) can be defined according to categories of signals (or resources) are independently established, and a reception node is notified of the established result.

A signal (or resource) may be any one of PDSCH, PDCCH, EPDCCH, CRS, DM-RS, CSI-RS, and CSI-IM of the LTE system. For example, it is assumed that a transmission structure composed of SFs based on an SF boundary of a P-Cell for use in the LTE system is a reference transmission structure according to one embodiment of the present invention. In this case, in order to adaptively transmit data based on the 1 ms TTI unit according to the LBT operation, a transmission structure in which the SF boundary starts at the remaining time points (e.g., a channel occupancy available time according to the LBT operation) other than the SF boundary of the P-Cell may be considered. In this case, a transmission time point of either data (e.g., PDSCH or DM-RS) or a signal for data demodulation may be based on a transmission structure in which the SF boundary is changed according to the LBT operation in terms of channel occupancy or utilization. In contrast, assuming that transmission time points of synchronous signals (e.g., PSS, SSS, CRS) and CSI measurement resources (e.g., CSI-RS, CSI-IM) which are commonly used by a plurality of UEs are based on any one of plural time-shifted transmission structures having different SF boundaries according to the LBT operation, the UEs must always perform blind detection (BD) for the situation indicating how much time is shifted to any one of a plurality of transmission structures.

Therefore, the embodiment of the present invention provides a method for determining whether a transmission time of the corresponding signal is based on plural transmission structures having different transmission unit boundaries according to purposes or categories of signals (or resources). In addition, candidate transmission structures capable of being transmitted not only to individual signals but also to signal groups are established, and transmission time points of signals contained in the above signal groups may also be established to satisfy the same transmission structure.

In addition, the BS or the network may directly inform the UE of a time-shifted transmission structure in which a downlink signal will be actually transmitted, or may inform the UE of a specific value (i.e., a time index or the number of OFDM symbols) used for time-shifting, such that the BS may support the reception operation of a UE.

Example 1-1

Figure 11:
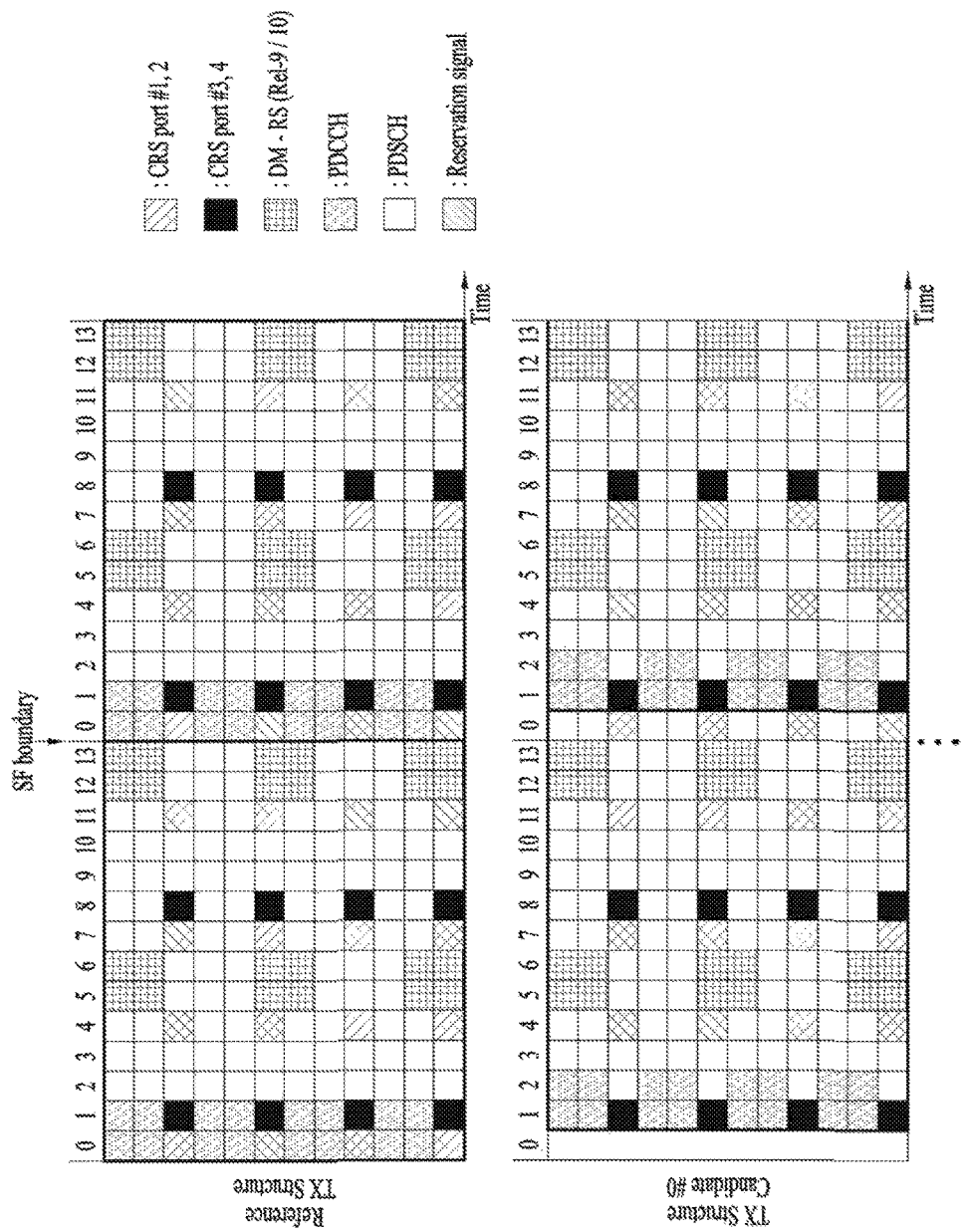
FIG. 11 is a conceptual diagram illustrating a downlink transmission structure obtained when the SF boundary is time-shifted by a predetermined time index with respect to a reference downlink transmission structure according to an embodiment of the present invention.

For example, as can be seen from FIG. 11, transmission time points of CRS and DM-RS are based on a reference transmission structure (i.e., a transmission structure based on SF configured to satisfy the SF boundary of P-Cell), and transmission time points of PDCCH and PDSCH are configured to satisfy a plurality of transmission structures being time-shifted in units of an OFDM symbol from the reference transmission structure. In this case, the aforementioned shifted transmission structure may be established in the OFDM symbol in which the SF boundary has time indexes other than time indexes (#3, #4, #5, #6, #10, #11, #12, #13) of the reference transmission structure, such that DM-RS resources of the reference transmission structure do not collide with PDCCH resources of the shifted transmission structure.

As can be seen from FIG. 11, the PDCCH region (or a resource region of a specific signal contained in a transmission unit) may be designed to perform the same resource element (RE) mapping in a plurality of transmission structures. The above-mentioned system design may prevent an increase in UE implementation complexity when the UE performs BD for a PDCCH region. As a result, although the RE mapping format of the PDCCH region is changed according to the transmission structure, the above-mentioned system design does not increase the UE implementation complexity.

Example 1-2

Figure 12:
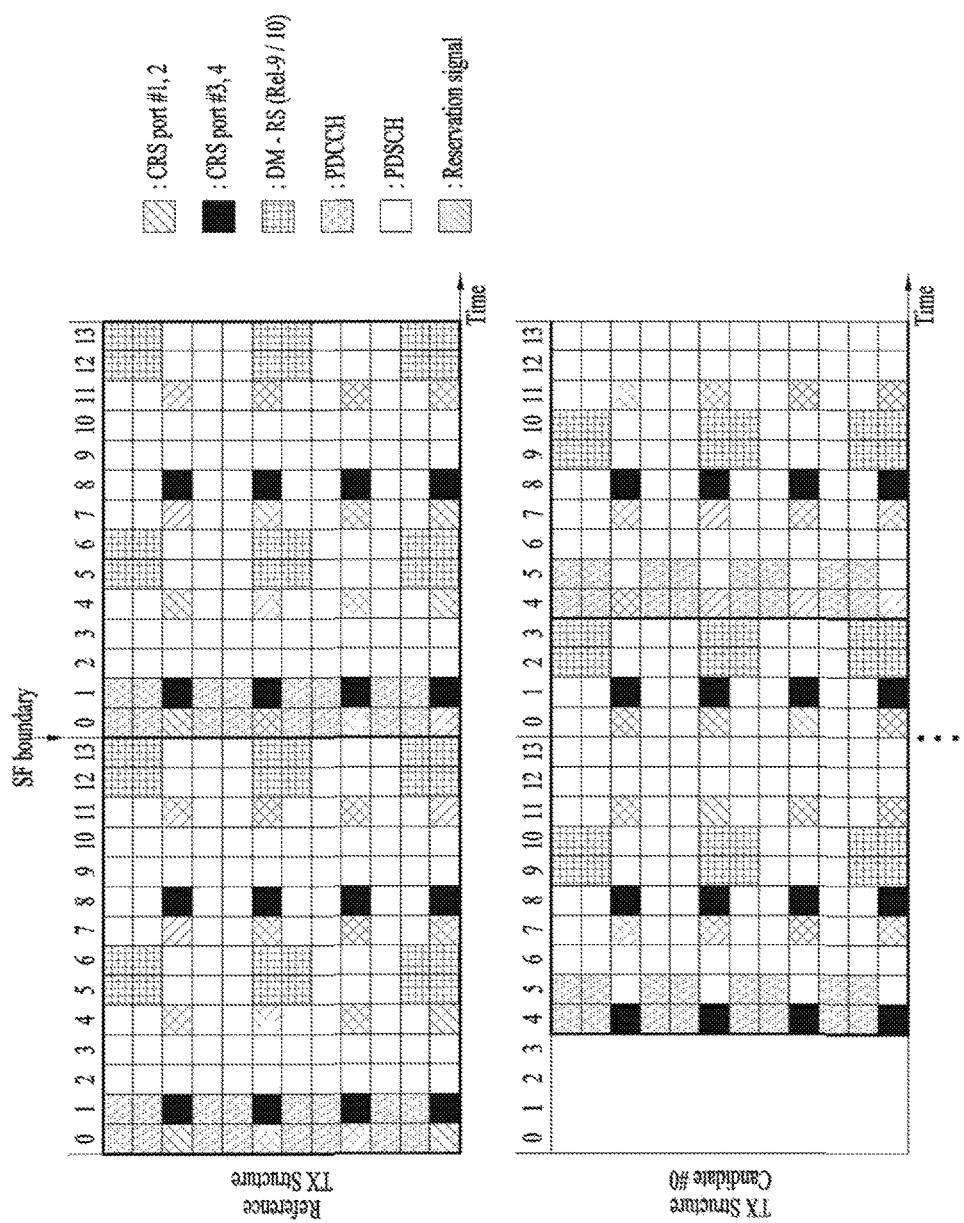
FIG. 12 is a conceptual diagram illustrating a downlink transmission structure obtained when the SF boundary is time-shifted by a predetermined time index with respect to a reference downlink transmission structure according to an embodiment of the present invention.

Alternatively, assuming that EPDCCH is used as a control channel, RE mapping of EPDCCH of the LTE Rel-12 system is designed in consideration of the DM-RS region, such that the transmission times of DM-RS and EPDCCH may be designed to satisfy the same transmission structure. For example, as can be seen from FIG. 12, the CRS transmission time may be determined to satisfy the reference transmission structure (i.e., the SF based transmission structure configured to satisfy the SF boundary of P-Cell), and the transmission time points of PDCCH, PDSCH, and DM-RS may be designed to satisfy a plurality of transmission structures shifted in units of an OFDM symbol from the reference transmission structure. In this case, the shifted transmission structure may be established in the OFDM symbol in which the SF boundary has time indexes (#0, #4, #7) of the reference transmission structure so as to prevent collision between the CRS resource of the reference transmission structure and the DM-RS resource of the shifted transmission structure. In this case, according to the EPDCCH transmission time, EPDCCH may be transmitted according to a plurality of transmission structures in the same manner as in DM-RS.

Example 1-3

Figure 13:
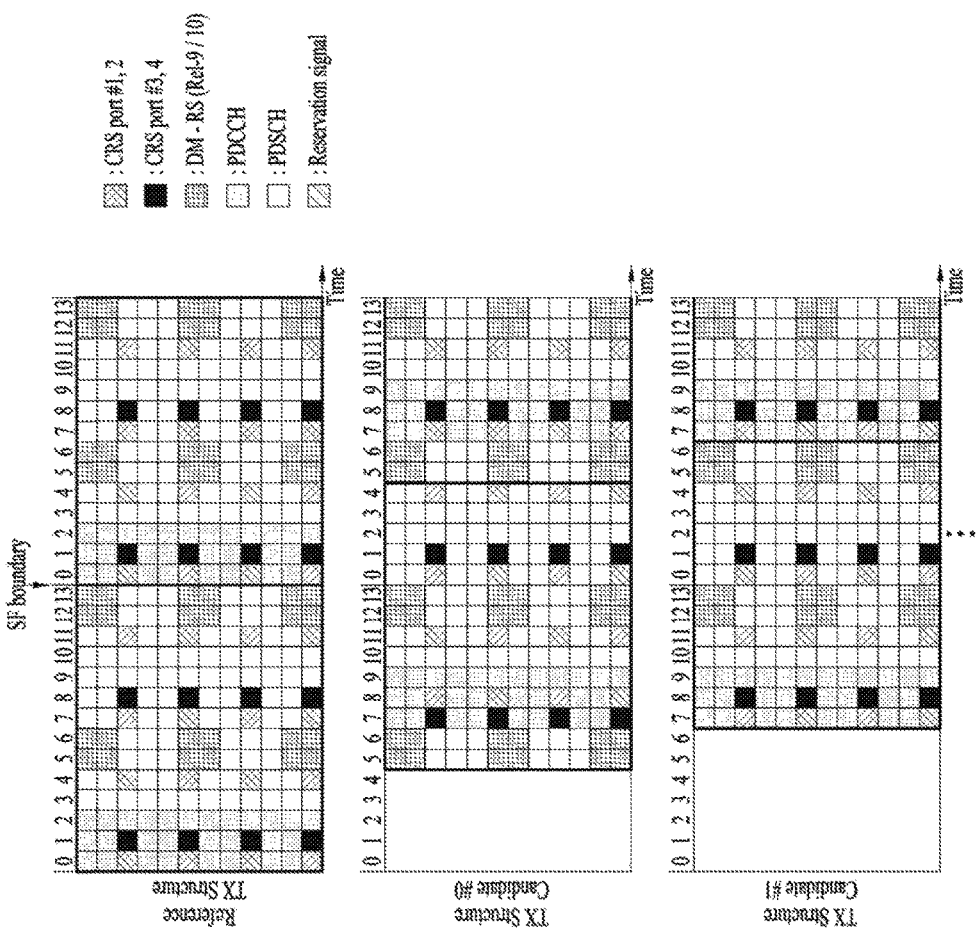
FIG. 13 is a conceptual diagram illustrating a downlink transmission structure obtained when the SF boundary is time-shifted by a predetermined time index with respect to a reference downlink transmission structure according to an embodiment of the present invention.

According to additional operations of the present invention, assuming that a transmission time of data is based on a total of N transmission structures and a transmission time of a specific signal is based on M (<N) transmission structures, a plurality of transmission structures, each of which can be applied to a data transmission time for a single transmission structure capable of being applied to a transmission time of the specific signal, may be used. For example, as can be seen from FIG. 13, assuming that the transmission time points of CRS and DM-RS are designed to satisfy a single reference transmission structure (i.e., the SF based transmission structure based on the SF boundary of P-Cell), and a transmission time of the PDCCH region is designed to satisfy two transmission structures (i.e., Tx structure candidates #0 and #1) time-shifted on a single slot basis, the transmission time of the PDSCH region may be designed to satisfy a plurality of time-shifted transmission structures on the condition that the SF for each transmission structure of the PDCCH region includes the entirety of the PDCCH region and the SF boundary is located before a maximum of 3 OFDM symbols on the basis of the start time of the PDCCH region. In this case, the transmission time of the PDSCH region may be limited in a manner that the entirety of two consecutive DM-RS symbols is always included in the transmission time of the PDSCH region, so as to maintain orthogonal cover code (OCC) characteristics of the DM-RS.

Alternatively, the above-mentioned operation may be established in a manner that different time shift values are applied to the PDCCH region and the PDSCH region. For example, as can be seen from the center part (i.e., the Tx structure candidate #0) of FIG. 13, whereas time shifting corresponding to 7 OFDM symbols is applied to the PDCCH region, it can be recognized that time shifting corresponding to 5 OFDM symbols is applied to the PDSCH region (or TTI).

Example 1-4

Figure 14:
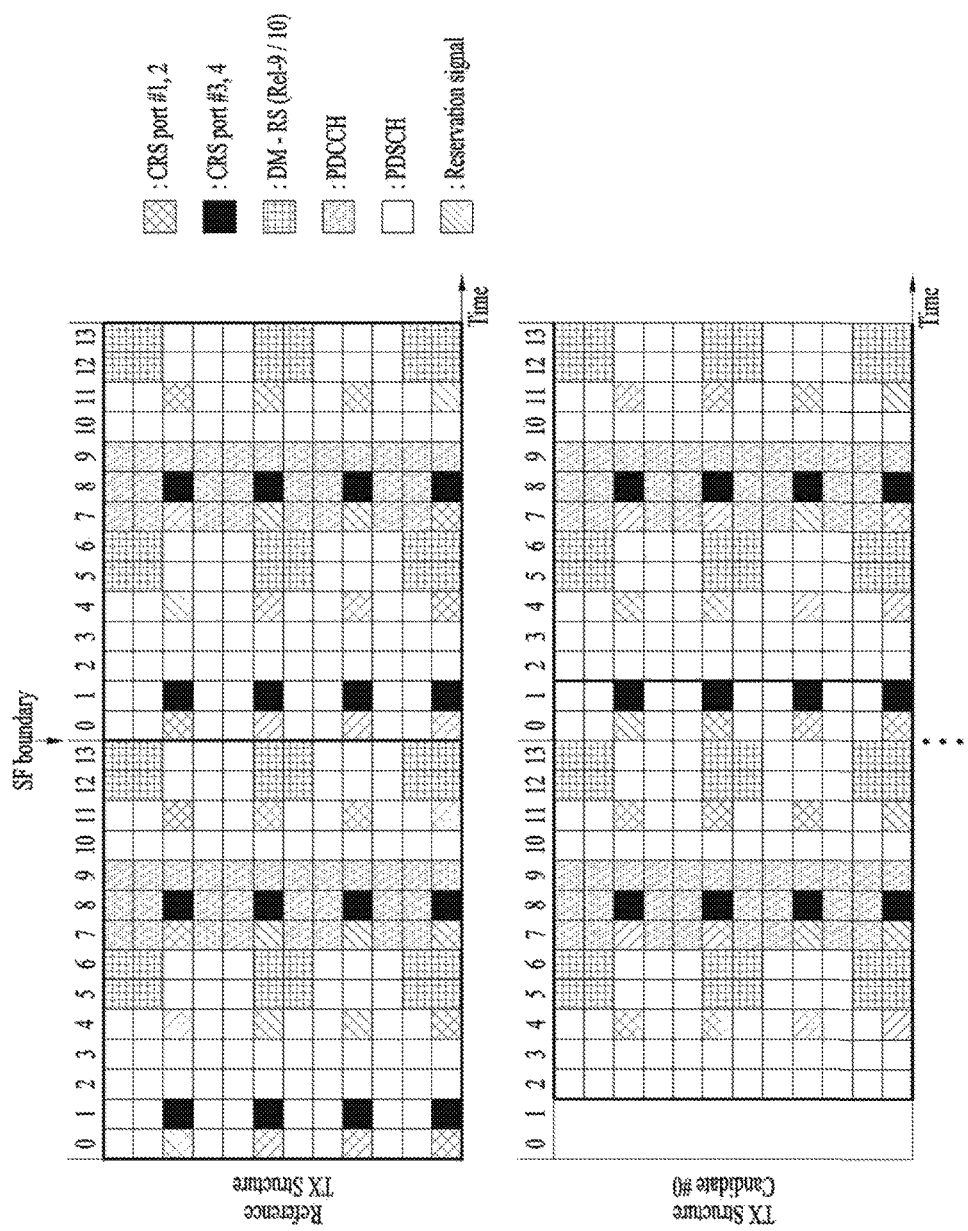
FIG. 14 is a conceptual diagram illustrating a downlink transmission structure obtained when the SF boundary is time-shifted by a predetermined time index with respect to a reference downlink transmission structure according to an embodiment of the present invention.

Assuming that a reference transmission structure (i.e., the SF based structure based on the SF boundary of P-Cell) is present by the additional operation of the present invention as shown in FIG. 14, a transmission time of the PDCCH region may be based on a single transmission structure (i.e., a reference Tx structure) time-shifted by one slot from the specific transmission structure, and a transmission time of the PDSCH region may be based on a plurality of time-shifted transmission structures obtained under the condition that the entire PDCCH region is included. In this case, the transmission time of the PDSCH region may be limited in a manner that the entirety of two consecutive DM-RS symbols is always included to maintain OCC characteristics of the DM-RS.

The PDCCH region is established at the center of the transmission unit (e.g., SF) contained in a reference transmission structure as shown in FIG. 14. If the time-shift value is limited to one slot or less, the UE may reduce the number of data symbols to be buffered, by half, as compared to the number of data symbols to be buffered in FIG. 10, instead of reducing the degree of freedom of a time shift value.

Example 1-5

Figure 15:
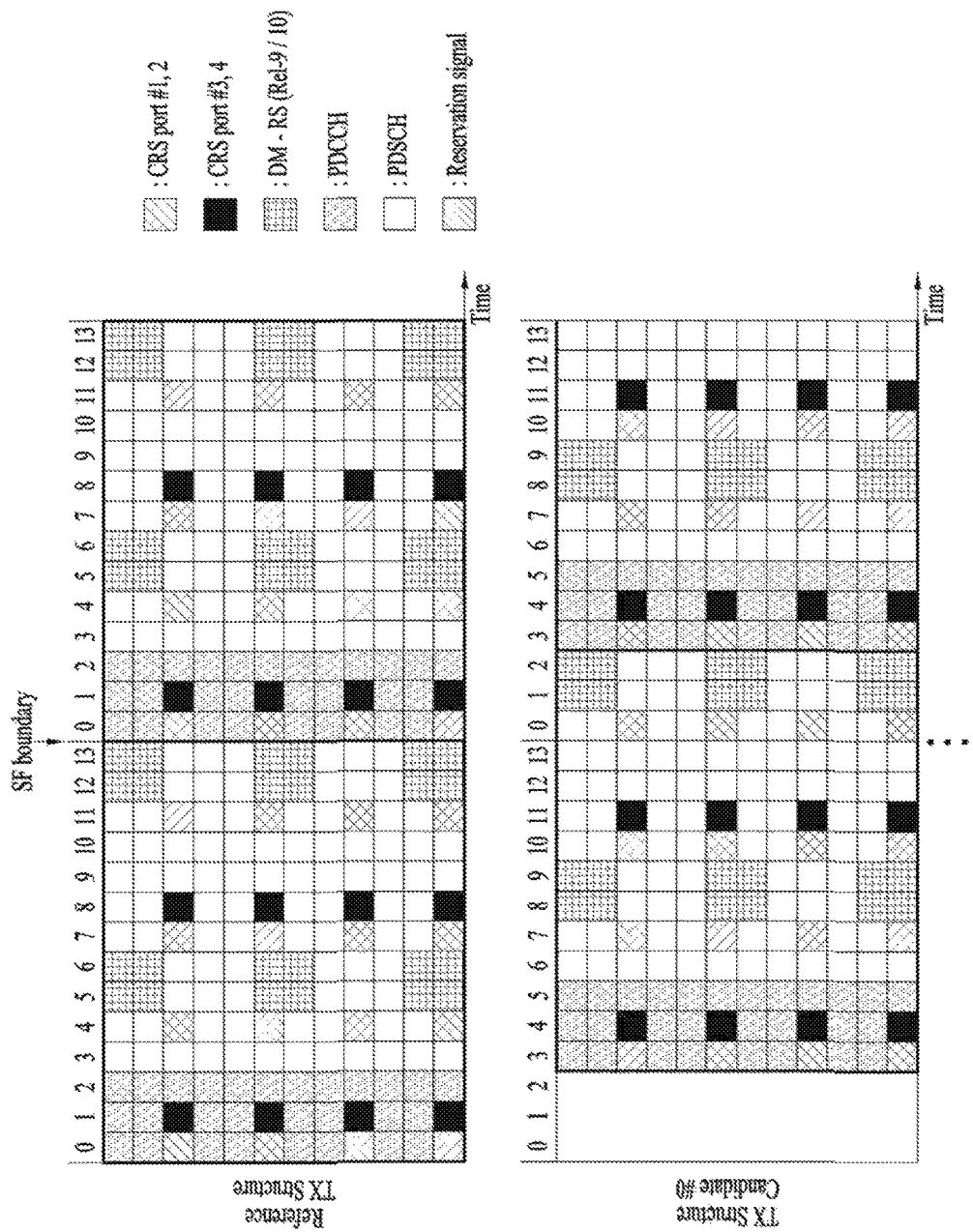
FIG. 15 is a conceptual diagram illustrating a downlink transmission structure obtained when the SF boundary is time-shifted by a predetermined time index with respect to a reference downlink transmission structure according to an embodiment of the present invention.

In another example, assuming that the transmission time points of PSS and SSS are based on a fixed reference transmission structure, and the transmission time points of CRS, PDSCH, and DM-RS are based on the time-shifted transmission structure, the available time-shift value may be limited to a specific value by which CRS and DM-RS to be time-shifted do not collide with PSS and SSS each having a relatively fixed transmission time. For example, FIG. 15 is a conceptual diagram illustrating a plurality of time-shifted transmission structures in which CRS, PDSCH, and DM-RS can be transmitted from the OFDM symbols having time indexes (#0, #3, #7, #10).

In this case, assuming that the CSI-R transmission time is based on a fixed reference transmission structure, resources of CRS ports #3 and #4 may collide with CRS-RS resources in association with some time shift values. Therefore, assuming that the number of CRS available antenna ports is limited to 2 or less, CRS-RS transmission may drop. In addition, CSI-RS transmission may also drop in association with a specific transmission structure.

Method: In this method, when a transmission time of a specific signal (or a measurement resource) can be defined for different time-shifted transmission structures (i.e., when a plurality of transmission time points can be defined), a resource region contained in a transmission unit for the corresponding signal (or measurement resource) is independently established per transmission time.

Although a transmission time of a specific signal is based on a plurality of transmission structures so as to reduce UE implementation complexity, a resource region in a transmission unit contained in each transmission structure may be designed to have the same format (e.g., the same RE mapping). However, assuming that the resource allocation scheme within a transmission unit of a specific signal is equally maintained for a plurality of transmission structures, resources of signals based on different transmission structures may collide with each other. For example, assuming that the reference transmission structure exists as shown in FIG. 11, if the time-shifted transmission structure starting from the OFDM symbol through which the PDCCH region has a time index #5 is allowed, a PDCCH resource region based on the time-shifted transmission structure and the DM-RS resource based on the reference transmission structure may collide. In this case, in order to prevent such collision, not only the reference transmission structure but also a start time at which a transmission structure of a new time-shifted transmission structure starts operation may be restricted.

Therefore, assuming that a transmission time point of a specific signal is defined for a plurality of transmission structures (i.e., when a plurality of transmission time points can be defined), the resource allocation scheme for the specific signal is independently established according to the transmission time point, the embodiment can support a transmission structure having a free transmission time for the transmission unit.

Example 2-1

Figure 16:
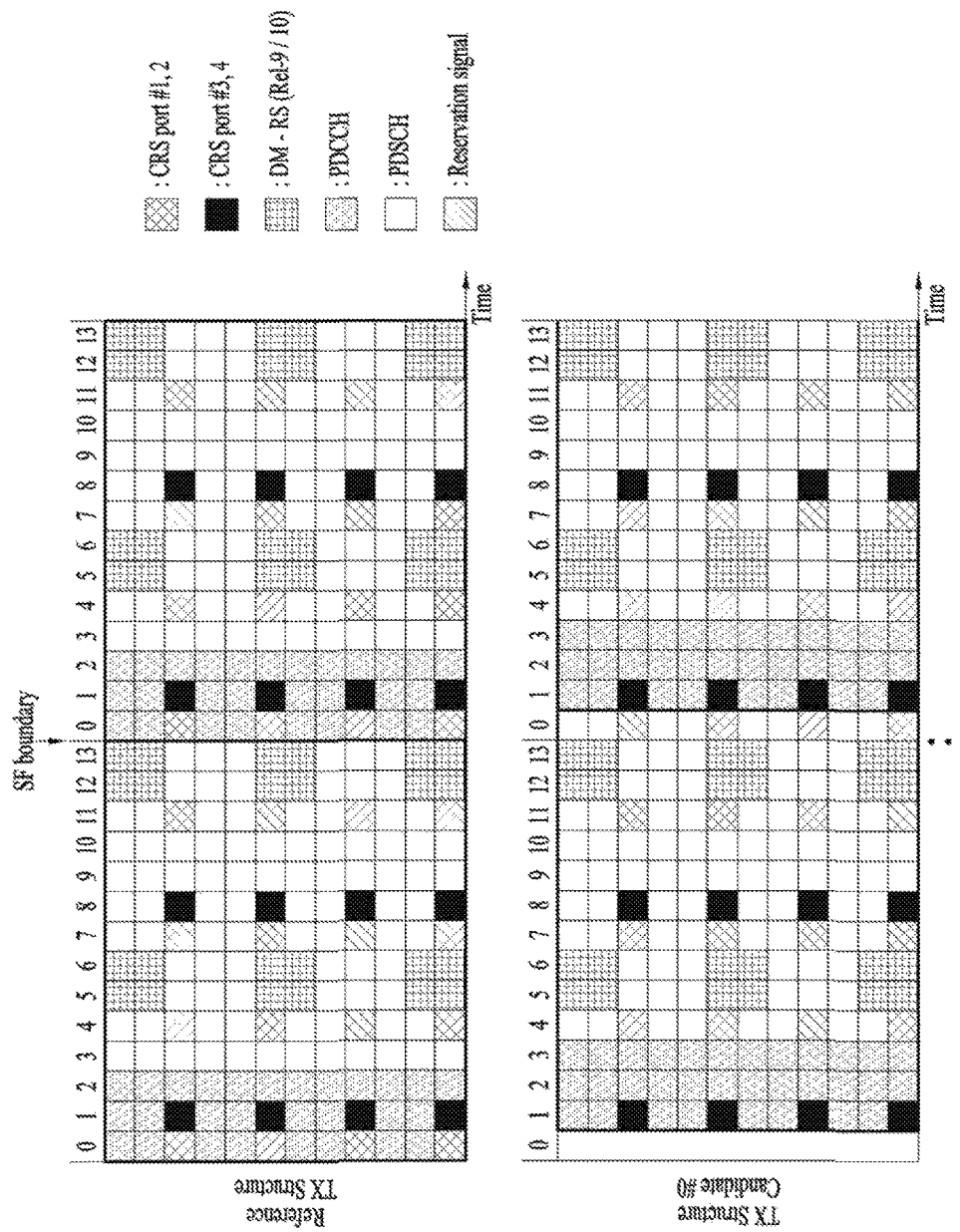
FIG. 16 is a conceptual diagram illustrating a downlink transmission structure obtained when the SF boundary is time-shifted by a predetermined time index with respect to a reference downlink transmission structure according to an embodiment of the present invention.

FIG. 16 is a conceptual diagram illustrating a method for independently establishing a resource region of the PDCCH in association with a plurality of transmission time points. In this case, the UE may pre-recognize the fact that a specific signal has an independent resource allocation scheme according to a transmission time, and the UE needs to include the detection and demodulation capabilities for the plurality of resource allocation schemes.

Method: In this method, when a transmission unit is composed of sub transmission units in which some signals have the same resource allocation, a plurality of transmission structures obtained when the transmission unit boundary is shifted by a predetermined value corresponding to a multiple of the corresponding sub transmission units may be defined.

Assuming that a transmission time of a specific signal is configured to satisfy a plurality of transmission structures according to the above-mentioned schemes, if the resource allocation schemes of the specific signals contained in the respective transmission structures are different from each other, complexity of detection and demodulation of a reception node is increased, and the transmission node must re-perform the resource allocation according to which transmission structure is applied to the corresponding signal, resulting in increased complexity of detection and demodulation.

Therefore, assuming that the transmission unit of the present invention is composed of sub transmission units having an iterative shape in association with resource allocation of some signals, a plurality of transmission structures obtained when the transmission unit boundary is shifted by a value corresponding to a multiple of the sub transmission units may be defined to mitigate implementation complexity such that resource allocation for at least some signals is not re-performed.

Example 3-1

For example, the SF acting as a transmission unit of the LTE system according to one embodiment may include two slots having the same resource allocation schemes for CRS and DM-RS.

Figure 17:
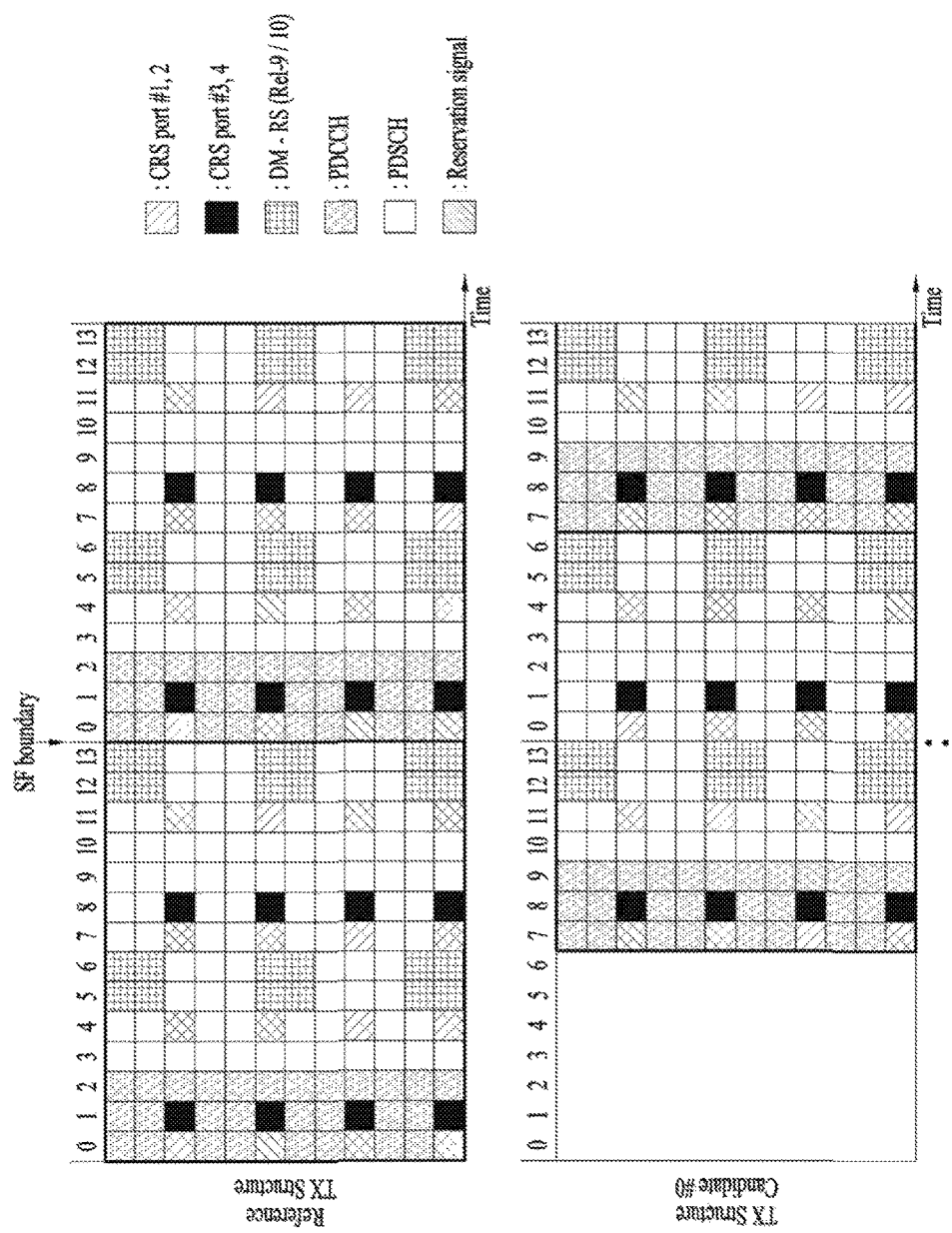
FIG. 17 is a conceptual diagram illustrating a downlink transmission structure obtained when the SF boundary is time-shifted by a predetermined time index with respect to a reference downlink transmission structure according to an embodiment of the present invention.

In this case, assuming that the transmission structure in which the SF boundary is shifted in units of a single slot as shown in FIG. 17 is introduced, RE mapping for PDCCH, PDSCH, CRS, DM-RS, etc. may also be equally maintained in all the transmission structures, resulting in reduction of implementation complexity. In addition, as shown in FIG. 17, the PDCCH and PDSCH transmission time points may be based on the transmission structure that is shifted by one slot, however, the DM-RS transmission time may satisfy or may not satisfy the above-mentioned transmission structure shifted by one slot as necessary. In this case, RE mapping of the DM-RS (i.e., the resource allocation scheme) is equally applied to two transmission structures, however, a sequence of the DM-RS may be changed according to which one of two transmission structures is applied to the transmission time.

Method: In this method, when a reference transmission structure exists and a transmission time point of a data region (or a specific resource region) is defined for a plurality of transmission structures, rate-matching or puncturing for the data region (or a specific resource region) colliding with specific signals within a reference transmission structure is performed.

Example 4-1

As shown in FIG. 17, assuming that the same resource allocation scheme for PDSCH is applied to the plurality of transmission structures, the BS may equally apply generation of TB to be transmitted from PDSCH and RE mapping to the plurality of transmission structures, resulting in reduced implementation complexity.

Figure 18:
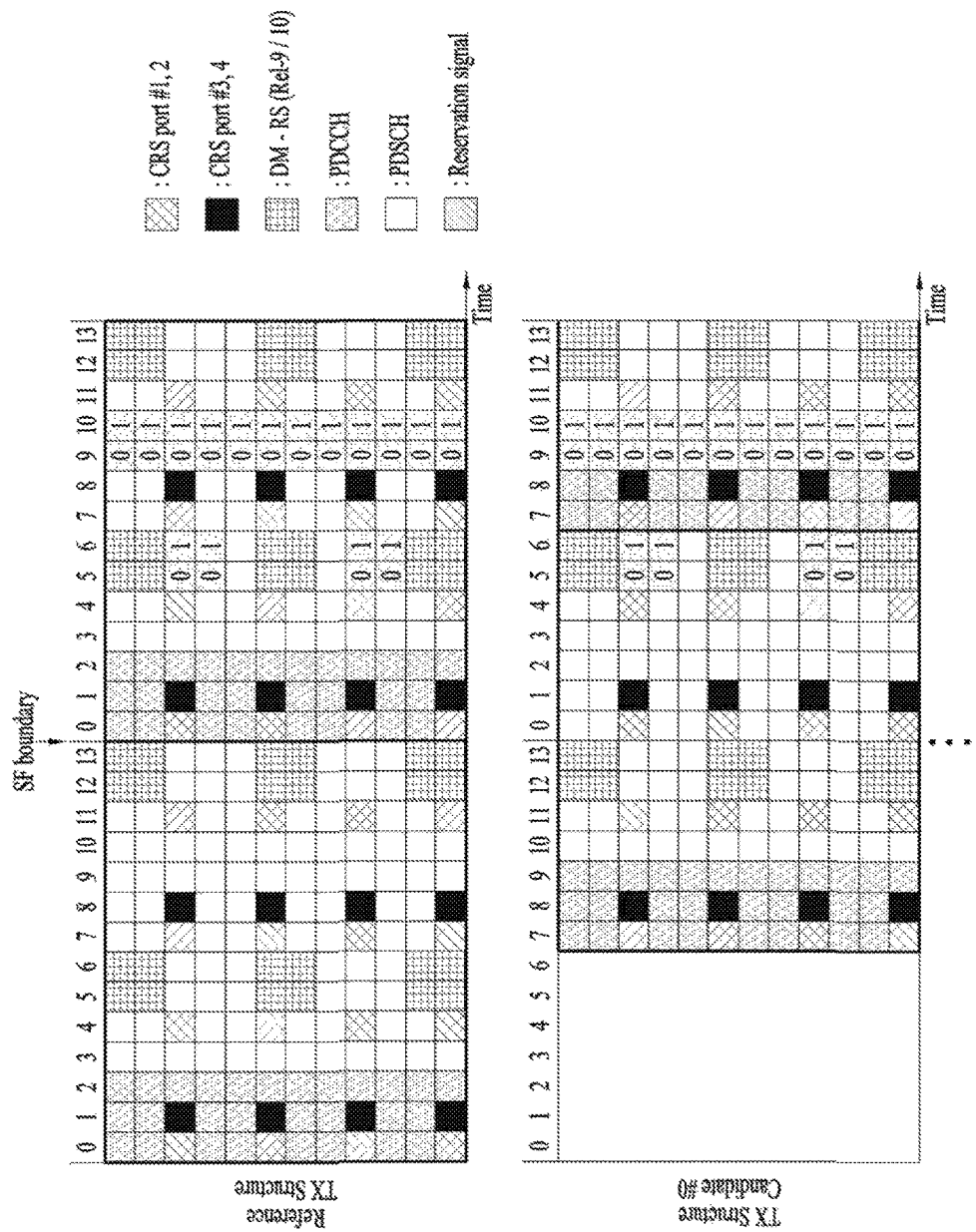
FIG. 18 is a conceptual diagram illustrating a downlink transmission structure obtained when the SF boundary is time-shifted by a predetermined time index with respect to a reference downlink transmission structure according to an embodiment of the present invention.

That is, the BS may transmit data symbols contained in the pre-generated PDSCH region to the PDSCH region contained in another transmission structure shifted on a time axis. However, assuming that signals wherein the transmission time points of PSS, SSS, CSI-RS, and CSI-IM, etc. do not satisfy the time-shifted transmission structure are transmitted according to a transmission time of the reference transmission structure, and the corresponding signal may collide with the PDSCH region contained in the shifted transmission structure. FIG. 18 is a conceptual diagram illustrating that the CSI-RS resource based on the reference transmission structure collides with the PDSCH region based on the time-shifted transmission structure. In this case, the BS may perform allocation of the generated data symbols and transmit the allocated data symbols on the assumption that CSI-RS resources are not pre-allocated to each transmission unit contained in the time-shifted transmission structure. If data such as CSI-RS or the like and signals based on other transmission structures are present, the UE may perform puncturing of REs in relation to the corresponding signal.

In addition, a CSI_RS resource of the reference transmission structure may collide with the PDCCH region of the time-shifted transmission structure as shown in the example of FIG. 18, and the PDCCH region may have great loss caused by the puncturing operation, such that rate matching may be carried out.

Method for establishing exclusive time at which specific signal may be transmitted According to the following description, after completion of successful channel occupancy according to the LBT operation, transmission units are regularly present in the successive signal transmission section (i.e., Tx burst) such that a transmission structure is achieved, and irregular signal transmission is allowed at the start time of the TX burst.

Method for constructing one transmission unit using a plurality of discontinuous time sections (or the transmission time of a control signal and the transmission time of the data signal are based on different transmission structures, and the transmission unit of a data signal is comprised of a plurality of time sections.)

In accordance with the scheme shown in FIG. 10, a control signal is received on a time axis at a time later than some data resources, such that the reception node must perform data buffering. In this case, assuming that the control channel is designed to precede the data resource region, the buffering issue may be addressed, and the floating SF advantages (e.g., RE mapping, TB size fixing, etc.) in FIG. 10 may be maintained. In order to address the above-mentioned issue, one transmission unit may be comprised of discontinuous time sections.

Example 5-1

Figure 19:
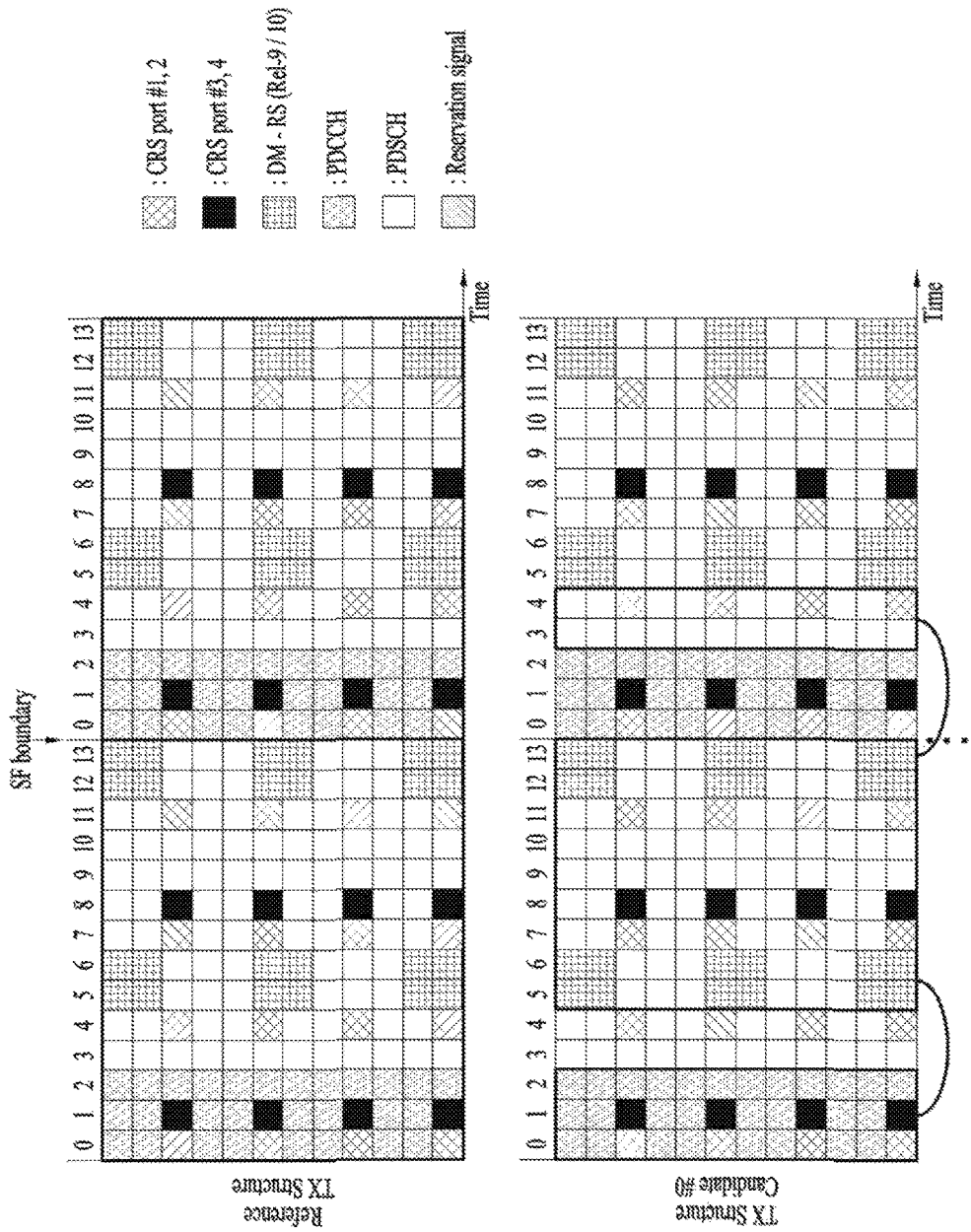
FIG. 19 is a conceptual diagram illustrating a discontinuous downlink transmission structure with respect to a reference downlink transmission structure according to an embodiment of the present invention.

For example, a time section through which a control signal is transmitted may move forward as shown in the transmission structure of FIG. 10, and one transmission unit is comprised of three time sections as shown in FIG. 19. Alternatively, the transmission time of the PDCCH region shown in FIG. 19 is constructed to satisfy the reference transmission structure, and the transmission time of the PDSCH region is constructed to satisfy the time-shifted transmission structure and the PDSCH region includes two discontinuous time sections.

Alternatively, as can be seen from FIG. 19, the data transmission region is constructed to satisfy the time-shifted transmission structure, and the control signal transmission region is not based on the time-shifted transmission structure and may be constructed to satisfy a separate transmission structure. That is, a transmission time of the PDCCH region for a specific TB is constructed to satisfy a specific reference transmission structure (i.e., the SF based transmission structure configured to satisfy the SF boundary of P-Cell), and the transmission time of the PDSCH region for the corresponding TB may be constructed to satisfy the time-shifted transmission structure.

Method: In this method, when transmission units contained in the Tx burst are configured to satisfy a specific transmission structure, an initial transmission unit may be designed to include a separate control channel (or irregular control channel) not based on the specific transmission structure (or the initial transmission unit is designed in a manner that a time section through which the control signal is transmitted is contiguous to the data transmission resource, and a subsequent transmission unit is designed in a manner that a transmission section of the control signal is discontinuously coupled to the data transmission resource.)

In FIG. 19, a time difference between a control signal and a data resource region may exist. Therefore, it is impossible to use the transmission unit shown in FIG. 19 in which an initial transmission unit after LBT is unable to continuously occupy the channel. Therefore, the initial transmission unit of the Tx burst may be designed in a continuous time section, differently from the transmission unit contained in the Tx burst. For this purpose, a separate (or irregular) control channel for the initial transmission unit may be established in a manner that a transmission section of the control signal is successively coupled to the data transmission resource.

Example 6-1

Figure 20:
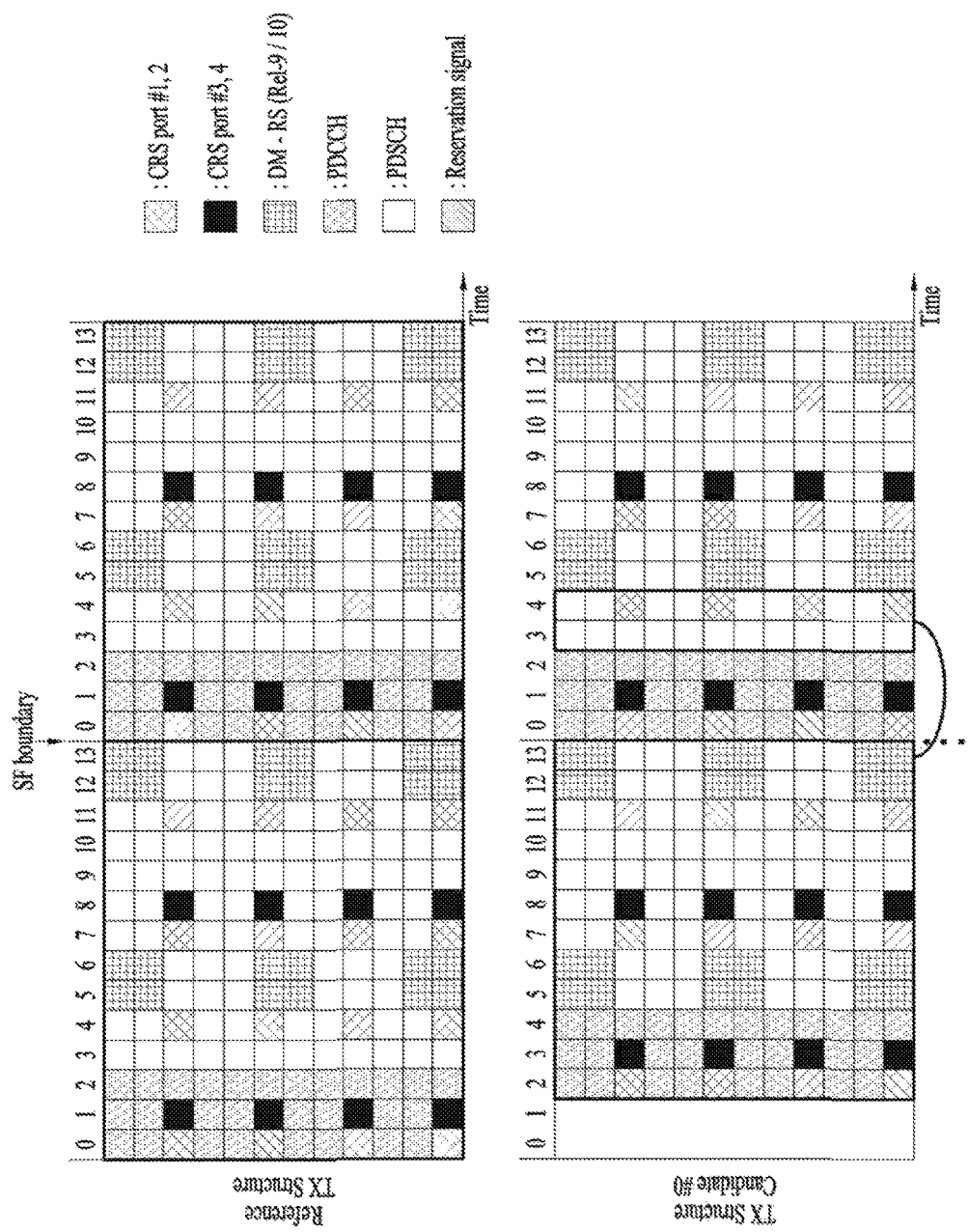
FIG. 20 is a conceptual diagram illustrating a discontinuous downlink transmission structure obtained when the SF boundary is time-shifted by a predetermined time index with respect to a reference downlink transmission structure according to an embodiment of the present invention.

FIG. 20 is a conceptual diagram illustrating that a separate control channel different from the control channel of the transmission unit shown in FIG. 19 is coupled to a data transmission section, such that an initial transmission unit having a successive time section of the Tx burst is constructed. In this case, CRS detection for the OFDM symbol having a time index #0 is attempted. If CRS is detected, BD of the PDCCH region located in OFDM symbols having time indexes (#0, #1, #2) is performed. In this case, the PDCCH region may include a DCI indicating how much time shifting is established between the current transmission structure and the reference transmission structure. The DCI may be commonly transmitted to a specific UE or a plurality of UEs. If CRS detection of the OFDM symbol having a time index #0 fails, BD of CRS to which time shifting contained in the separate (or irregular) control channel is applied is performed, such that the start position of the initial transmission unit of the Tx burst may be detected.

Figure 21:
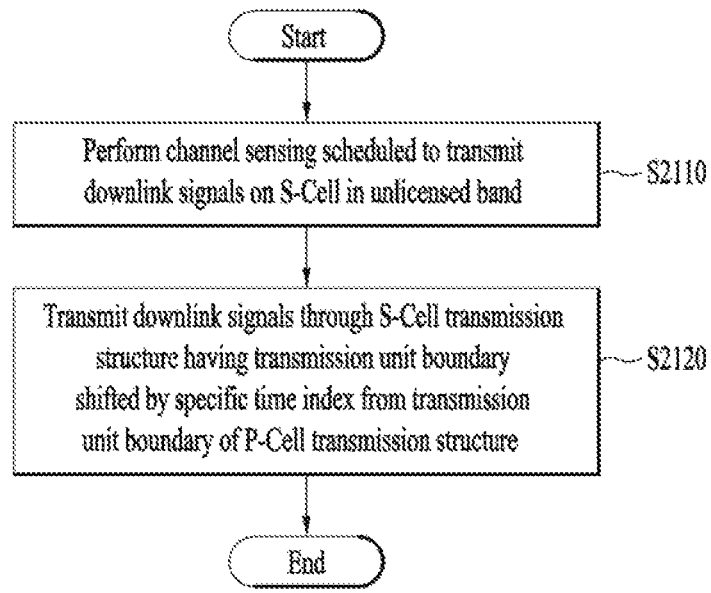
FIG. 21 exemplarily shows the operations according to an embodiment of the present invention.

FIG. 21 is a conceptual diagram illustrating the operations of the embodiment. FIG. 21 is a conceptual diagram illustrating a method for sensing an unlicensed band in a wireless communication system and a method for transmitting a downlink signal according to the channel sensing. The above-mentioned method may be carried out by a transmission node configured to transmit a downlink signal by performing the channel sensing.

The transmission node may sense a channel to be used for transmission of a downlink signal on a secondary cell (S-Cell) in step S2110. If the channel to be used for transmission of the downlink signal according to the channel sensing result is determined in an unoccupied state, the transmission node may transmit a downlink signal through the S-Cell transmission structure that has a boundary of the transmission unit shifted by a predetermined time index from the boundary of the transmission unit of the primary cell (P-Cell) transmission structure in step S2120. The constant time index may be selected from one of a plurality of candidate time indexes.

In addition, some signals from among the downlink signals transmitted through the S-Cell may be transmitted at a transmission time defined in the P-Cell transmission structure, and the remaining signals may be transmitted at a transmission time defined in the S-Cell transmission structure.

The remaining signals may be transmitted at a specific time point that is shifted by a predetermined time corresponding to one selected from among the plurality of candidate time indexes from the boundary of a transmission unit of the P-Cell transmission structure.

A plurality of transmission times for the first downlink signal from among the remaining signals may be defined on the basis of a single transmission time of the second downlink signal.

In addition, the transmission (Tx) node may transmit information regarding the plurality of candidate S-Cell transmission structures that are defined per category of the downlink signal or per downlink signal, to the reception (Rx) node.

Some candidate time indexes from among the plurality of candidate time indexes may be restricted to prevent collision between a specific downlink signal contained in the transmission unit of the P-Cell and a downlink signal contained in the transmission unit of the S-Cell.

In addition, the transmission (Tx) node may apply the same RE (Resource Element) mapping as in the P-Cell transmission structure to some downlink signals or some downlink signal groups, such that the transmission (Tx) node may allocate resources to the transmission structure of the S-Cell.

In addition, assuming that the transmission unit of the P-Cell transmission structure is composed of sub transmission units in which the same allocation is achieved, the S-Cell transmission structure is shifted by a time index corresponding to the length of the sub transmission unit, and resource allocation contained in the P-Cell transmission structure may be used for the S-Cell transmission structure.

Although the embodiments of the present invention have been briefly disclosed with reference to FIG. 21 for convenience of description, the embodiment of FIG. 21 may alternatively or additionally include at least some parts of the above-mentioned embodiment(s).

Figure 22:
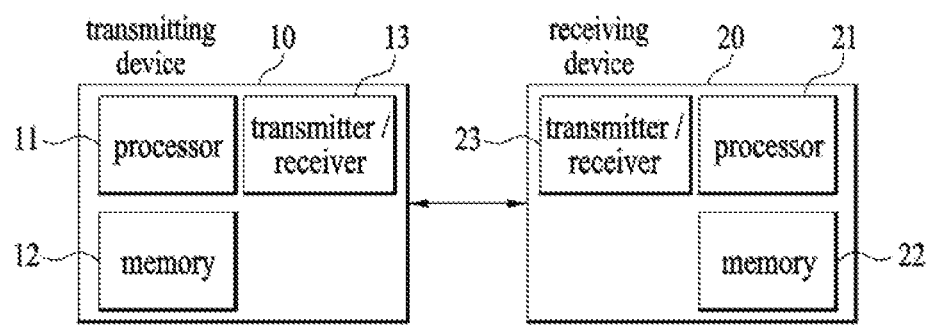
FIG. 22 is a block diagram illustrating a device for implementing embodiment(s) of the present invention.

FIG. 22 is a block diagram of a transmitting device 10 and a receiving device 20 configured to implement exemplary embodiments of the present invention. Referring to FIG. 22, the transmitting device 10 and the receiving device 20 respectively include transmitter/receivers 13 and 23 for transmitting and receiving radio signals carrying information, data, signals, and/or messages, memories 12 and 22 for storing information related to communication in a wireless communication system, and processors 11 and 21 connected operationally to the transmitter/receivers 13 and 23 and the memories 12 and 22 and configured to control the memories 12 and 22 and/or the transmitter/receivers 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receivers 13 and 23 include one or more antennas. An antenna performs a function of transmitting signals processed by the transmitter/receivers 13 and 23 to the exterior or receiving radio signals from the exterior to transfer the radio signals to the transmitter/receivers 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE(-A), however, the embodiments of the present application can be applied to any wireless communication system in which interferences exist.

As is apparent from the above description, the method and apparatus for transmitting or receiving a downlink signal within an unlicensed band of a wireless communication system according to the embodiments may efficiently transmit or receive the downlink signal within an unlicensed band, such that resource use efficiency in the unlicensed band may be increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for channel sensing in an unlicensed band and transmitting downlink signals in a wireless communication system, wherein the method is performed by a transmission node configured to transmit the downlink signal after the channel sensing, the method comprising:
   sensing a channel scheduled to transmit downlink signals on a secondary cell (S-Cell) in the unlicensed band, wherein the downlink signals are intended for a user equipment (UE) to decode; and
   when the channel scheduled to transmit the downlink signals is determined to be in an unoccupied state according to the channel sensing, transmitting the downlink signals through a secondary cell (S-Cell) transmission structure having a boundary of a transmission unit shifted by a specific time index from a boundary of a transmission unit of a primary cell (P-Cell) transmission structure,
   wherein the specific time index is selected from among a plurality of candidate time indexes,
   wherein at least one of the downlink signals transmitted on the S-Cell are transmitted at transmission times same as transmission times of the P-Cell transmission structure, and remaining downlink signals other than the at least one of the downlink signals are transmitted on the S-Cell at transmission times defined for the S-Cell transmission structure,
   wherein the remaining downlink signals include a first downlink signal and a second downlink signal, the first downlink signal having a plurality of candidate transmission times which are defined in reference to a single transmission time of the second downlink signal, and
   wherein, when occupation of the channel scheduled to transmit the downlink signals on the S-Cell in the unlicensed band is succeeded by the transmission node, first transmission times in the transmission times defined for the S-Cell transmission structure carry control signals and first data signals among the downlink signals and correspond to continuous time indices, and second transmission times in the transmission times defined for the S-Cell transmission structure carry second data signals among the downlink signals and correspond to discontinuous time indices, wherein values of the continuous time indices are less than values of the discontinuous time indices.

2. The method according to claim 1, wherein the remaining downlink signals are transmitted at a time point shifted by a predetermined time corresponding to one selected from among the plurality of candidate time indexes from the boundary of the transmission unit of the P-Cell transmission structure.

3. The method according to claim 1, further comprising:
   transmitting information regarding a plurality of candidate S-Cell transmission structures defined per category of the downlink signals or per group of the downlink signals, to the UE.

4. The method according to claim 1, wherein at least one candidate time indexes from among the plurality of candidate time indexes is restricted to prevent collision between a specific downlink signal in a transmission unit of the P-Cell and a specific downlink signal in a transmission unit of the S-Cell.

5. The method according to claim 1, further comprising:
   allocating resources for at least one downlink signal or at least one downlink signal group in the S-Cell transmission structure by applying a resource element (RE) mapping same as a RE mapping in the P-Cell transmission structure.

6. The method according to claim 1, wherein:
   if the transmission unit of the P-Cell transmission structure includes one or more sub transmission units having an identical resource allocation,
   the S-Cell transmission structure is shifted by a time index corresponding to a length of the sub transmission unit, and the identical resource allocation of the P-Cell transmission structure is used for the S-Cell transmission structure.

7. A transmission node configured to performing channel sensing in an unlicensed band and transmit downlink signals associated with in a wireless communication system, the transmission node comprising:
   a transmitter;
   a receiver; and
   a processor configured to control the transmitter and the receiver,
   wherein the processor senses a channel scheduled to transmit downlink signals on a secondary cell (S-Cell) in the unlicensed band, wherein the downlink signals are intended for a user equipment (UE) to decode, and when the channel scheduled to transmit the downlink signals is determined to be in an unoccupied state according to the channel sensing, transmits the downlink signals through a secondary cell (S-Cell) transmission structure having a boundary of a transmission unit shifted by a specific time index from a boundary of a transmission unit of a primary cell (P-Cell) transmission structure,
   wherein the specific time index is selected from among a plurality of candidate time indexes,
   wherein at least one of the downlink signals transmitted on the S-Cell are transmitted at transmission times same as transmission times of the P-Cell transmission structure, and the remaining downlink signals other than the at least one of the downlink signals are transmitted on the S-Cell at transmission times defined for the S-Cell transmission structure,
   wherein the remaining downlink signals include a first downlink signal and a second downlink signal, the first downlink signal having a plurality of candidate transmission times which are defined in reference to a single transmission time of the second downlink signal, and wherein, when occupation of the channel scheduled to transmit the downlink signals on the S-Cell in the unlicensed band is succeeded by the transmission node, first transmission times in the transmission times defined for the S-Cell transmission structure carry control signals and first data signals among the downlink signals and correspond to continuous time indices, and second transmission times in the transmission times defined for the S-Cell transmission structure carry second data signals among the downlink signals and correspond to discontinuous time indices, wherein values of the continuous time indices are less than values of the discontinuous time indices.

8. The transmission node according to claim 7, wherein the remaining downlink signals are transmitted at a time point shifted by a predetermined time corresponding to one selected from among the plurality of candidate time indexes from the boundary of the transmission unit of the P-Cell transmission structure.

9. The transmission node according to claim 7, wherein the processor transmits information regarding a plurality of candidate S-Cell transmission structures defined per category of the downlink signals or per group of the downlink signals, to the UE.

10. The transmission node according to claim 7, wherein at least one candidate time indexes from among the plurality of candidate time indexes is restricted to prevent collision between a specific downlink signal in a transmission unit of the P-Cell and a specific downlink signal in a transmission unit of the S-Cell.

11. The transmission node according to claim 7, wherein the processor allocates resources for at least one downlink signal or at least one downlink signal group in the S-Cell transmission structure by applying a resource element (RE) mapping same as a RE mapping in the P-Cell transmission structure.

12. The transmission node according to claim 7, wherein:
if the transmission unit of the P-Cell transmission structure includes one or more sub transmission units having an identical resource allocation,
the S-Cell transmission structure is shifted by a time index corresponding to a length of the sub transmission unit, and the identical resource allocation of the P-Cell transmission structure is used for the S-Cell transmission structure.

13. The method according to claim 1, wherein the first downlink signal is punctured and the second downlink signal is rate-matched when the first downlink signal and the second downlink signal collide with the at least one of the downlink signals in the S-Cell transmission structure.

14. The transmission node according to claim 7, wherein the first downlink signal is punctured and the second downlink signal is rate-matched when the first downlink signal and the second downlink signal collide with the at least one of the downlink signals in the S-Cell transmission structure.

* * * * *